US008479984B2

(12) United States Patent
Parmelee et al.

(10) Patent No.: US 8,479,984 B2
(45) Date of Patent: *Jul. 9, 2013

(54) AUTOMATED BANKING MACHINE THAT OPERATES RESPONSIVE TO DATA BEARING RECORDS

(75) Inventors: Christopher L. Parmelee, Medina, OH (US); Mark D. Smith, North Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,759

(22) Filed: Sep. 10, 2012

(65) Prior Publication Data

US 2013/0001302 A1 Jan. 3, 2013

Related U.S. Application Data

(60) Continuation of application No. 12/291,452, filed on Nov. 10, 2008, now Pat. No. 8,261,975, which is a division of application No. 09/683,942, filed on Mar. 5, 2002, now Pat. No. 7,451,116.

(60) Provisional application No. 60/319,015, filed on Nov. 29, 2001, provisional application No. 60/273,996, filed on Mar. 7, 2001.

(51) Int. Cl.
*G06F 19/00* (2006.01)

(52) U.S. Cl.
USPC .......................................................... 235/379

(58) Field of Classification Search
USPC ............................................ 235/379; 705/50
See application file for complete search history.

(56) References Cited

U.S. PATENT DOCUMENTS

| | | | |
|---|---|---|---|
| 4,355,369 | A | 10/1982 | Garvin |
| 4,542,287 | A | 9/1985 | Watanabe |
| 4,578,530 | A | 3/1986 | Zeidler |
| 5,064,999 | A | 11/1991 | Okamoto |

(Continued)

FOREIGN PATENT DOCUMENTS

| | | | |
|---|---|---|---|
| CA | 2309463 | A1 | 11/2000 |
| EP | 0569816 | A2 | 11/1993 |

(Continued)

OTHER PUBLICATIONS

Schneider, G.P., Electronic Commerce 4th Edition, Thompson, Boston, MA 02210, 2003, pp. 512-514.

(Continued)

*Primary Examiner* — Seung Lee

(74) *Attorney, Agent, or Firm* — Christopher L. Parmelee; Ralph E. Jocke; Walker & Jocke

(57) ABSTRACT

An automated banking machine system operates to cause financial transfers responsive to data read from data bearing records. The system is operative to read a financial card bearing account indicia with a card reader. A user is able to perform at least one banking operation responsive to account indicia read by the card reader from the card. The banking operations include dispensing cash and accessing financial accounts. The card reader may further communicate a component to an automated banking machine component, which is operative to use the component from the card reader to operate the card reader. The automated banking machine may store signed electronic documents in a data store in association with the user's financial account such as checking, savings, debit, or credit account.

21 Claims, 11 Drawing Sheets

U.S. PATENT DOCUMENTS

| | | | |
|---|---|---|---|
| 5,220,501 | A | 6/1993 | Lawlor |
| 5,386,104 | A | 1/1995 | Sime |
| 5,450,938 | A | 9/1995 | Rademacher |
| 5,453,601 | A | 9/1995 | Rosen |
| 5,613,001 | A | 3/1997 | Bakhoum |
| 5,636,276 | A | 6/1997 | Brugger |
| 5,644,727 | A | 7/1997 | Atkins |
| 5,650,604 | A | 7/1997 | Marcous |
| 5,650,605 | A | 7/1997 | Morioka |
| 5,677,955 | A | 10/1997 | Doggett et al. |
| 5,742,845 | A | 4/1998 | Wagner |
| 5,793,964 | A | 8/1998 | Rogers |
| 5,818,939 | A | 10/1998 | Davis |
| 5,826,246 | A | 10/1998 | Bator |
| 5,850,442 | A | 12/1998 | Muftic |
| 5,920,640 | A | 7/1999 | Salatino |
| 5,943,423 | A | 8/1999 | Muftic |
| 5,974,146 | A | 10/1999 | Randle |
| 5,992,570 | A | 11/1999 | Walter |
| 2,999,626 | A | 12/1999 | Mullin et al. |
| 6,085,976 | A | 7/2000 | Sehr |
| 6,092,202 | A | 7/2000 | Veil |
| 6,098,053 | A | 8/2000 | Slater |
| 6,149,056 | A | 11/2000 | Stinson |
| 6,167,518 | A | 12/2000 | Padgett |
| 6,192,130 | B1 | 2/2001 | Otway |
| 6,199,754 | B1 | 3/2001 | Epstein |
| 6,223,983 | B1 | 5/2001 | Kjonaas |
| 6,253,322 | B1 | 6/2001 | Susaki |
| 6,262,717 | B1 | 7/2001 | Donohue |
| 6,289,320 | B1 | 9/2001 | Drummond |
| 6,308,887 | B1 | 10/2001 | Korman |
| 6,336,590 | B1 | 1/2002 | Kubitz |
| 6,430,688 | B1 | 8/2002 | Kohl |
| 6,470,326 | B1 | 10/2002 | Drummond |
| 6,474,548 | B1 | 11/2002 | Montross |
| 6,603,872 | B2 | 8/2003 | Jones |
| 6,705,517 | B1 | 3/2004 | Zajkowski |
| 6,826,685 | B1 | 11/2004 | Douglas |
| 6,848,048 | B1 | 1/2005 | Holmes |
| 6,895,386 | B1 | 5/2005 | Bachman |
| 2002/0004783 | A1 | 1/2002 | Paltenghe |
| 2002/0019937 | A1 | 2/2002 | Edstrom |
| 2002/0023220 | A1 | 2/2002 | Kaplan |
| 2002/0026575 | A1 | 2/2002 | Wheeler |
| 2002/0032656 | A1 | 3/2002 | Chen |
| 2002/0069179 | A1 | 6/2002 | Slater |
| 2002/0128969 | A1 | 9/2002 | Parmelee et al. |
| 2002/0186838 | A1 | 12/2002 | Brandys |
| 2003/0115463 | A1 | 6/2003 | Wheeler |
| 2004/0006657 | A1 | 1/2004 | Wagner |
| 2004/0215566 | A1 | 10/2004 | Meurer |
| 2005/0246292 | A1 | 11/2005 | Sarcanin |

FOREIGN PATENT DOCUMENTS

| | | | |
|---|---|---|---|
| EP | 0859488 | A2 | 8/1998 |
| EP | 1055989 | A1 | 11/2000 |
| JP | 10327147 | | 12/1998 |
| RU | 2117328 | C1 | 8/1998 |
| WO | 97/30425 | A1 | 8/1997 |
| WO | 97/45796 | A1 | 12/1997 |
| WO | 98/24041 | A1 | 6/1998 |
| WO | 98/33296 | A1 | 7/1998 |
| WO | 99/33221 | A1 | 7/1999 |
| WO | 00/05667 | A2 | 2/2000 |
| WO | 00/11828 | A1 | 3/2000 |
| WO | 00/55793 | A1 | 9/2000 |
| WO | 01/33344 | A2 | 5/2001 |

OTHER PUBLICATIONS

Bruce Schneier, Applier Cryptography, 1996, John Wiley & Sons, Inc., Second Edition, pp. 37-38.

U.S. Appl. No. 60/255,985: “ATM Manager Pro: User’s Manual”, filed Dec. 15, 2000, e-Classic Systems, pp. 42-43 and 44-46.

U.S. Appl. No. 60/223,076: Wheeler et al.: “Systems and Methods for Trusted Electronic Messages”, filed Aug. 4, 2000.

AUTOMATED BANKING MACHINE THAT OPERATES RESPONSIVE TO DATA BEARING RECORDS

CROSS REFERENCE TO RELATED APPLICATIONS

This application is a continuation of U.S. application Ser. No. 12/291,452 filed Nov. 10, 2008, now U.S. Pat. No. 8,261,975, which is a divisional of U.S. application Ser. No. 09/683,942 filed Mar. 5, 2002, now U.S. Pat. No. 7,451,116, which claims benefit pursuant to 35 U.S.C. §119(e) of both U.S. Provisional Application 60/319,015 filed Nov. 29, 2001 and U.S. Provisional Application 60/273,996 filed Mar. 7, 2001.

TECHNICAL FIELD

An exemplary embodiment relates to automated banking machines that operate to cause financial transfers responsive to data read from data bearing records which may be classified in U.S. Class 235, Subclass 379.

BACKGROUND

Automated banking machines are known. Automated banking machines enable customers to carry out banking transactions. Banking transactions that may be carried out with automated banking machines include the dispensing of cash, the receipt of deposits, the transfer of funds between accounts, the payment of bills and account balance inquiries. The type of banking transactions a customer can carry out are determined by the capabilities of the particular machine and the programming of the institution operating the machine. Other types of automated banking machines may allow customers to charge against accounts or to transfer funds. Other types of automated banking machines may print or dispense items of value such as coupons, tickets, wagering slips, vouchers, checks, food stamps, money orders, scrip or travelers checks. For purposes of this disclosure reference to an automated banking machine, automated transaction machine, or an automated teller machine shall encompass any device which carries out transactions including transfers of value.

OBJECTS OF EXEMPLARY EMBODIMENTS

It is an object of an exemplary form of an embodiment to provide a system and method which can be easily employed by individuals for protecting electronic documents.

It is a further object of an exemplary form of an embodiment to provide a system and method of storing electronic documents which can preserve the integrity and confidentiality of the electronic documents for long periods of time.

It is a further object of an exemplary form of an embodiment to provide a system and method which can be easily employed by individuals for digitally signing electronic documents.

It is a further object of an exemplary form of an embodiment to provide a system and method of protecting the confidentiality of private keys used to digitally sign electronic documents.

It is a further object of an exemplary form of an embodiment to provide a system and method of digitally signing electronic documents which provides further assurance to individuals that digital signing of electronic documents is a safe substitute for signing paper documents.

Further objects of exemplary forms of embodiments will be made apparent in the following Detailed Description of Exemplary Embodiments and the appended claims.

The foregoing objects may be accomplished in an exemplary embodiment by a system and method of storing and digitally signing electronic documents with automated transaction machines.

As an increasing number of individuals own or have access to personal computers, more and more individuals are generating electronic documents. Examples of electronic documents include electronically filed tax returns, contracts for goods or services ordered online through the internet, e-mail, word processing documents, or any other type of document that has a digital form. Some electronic documents are of a type that the individuals involved in generating, sending or receiving such documents might prefer to have the documents maintained as secure and confidential for long periods of time.

Unfortunately, many personal computers have insecure configurations. With the increasing popularity of the Internet, many personal computers are vulnerable to being accessed remotely by hackers on the Internet. Further, many home personal computers are not configured with passwords and as a result anyone with physical access to the personal computer such as a friend, a child care giver, or a relative may accidently or intentionally gain access to sensitive electronic documents. Although cryptography software exists to encrypt private electronic documents, many individuals do not have the technical skill to install and configure encryption software correctly on their personal computers. Consequently, there exists a need for a system and method of protecting personal electronic documents which can be more easily used by individuals.

Electronic documents belonging to individuals are often stored on a hard drive of a personal computer. For example, consumer tax software typically generates electronic tax return documents which are stored on a hard drive. Word processors often store electronic document files in a common directory on a hard drive. E-mail received by and sent from a personal computer is also often stored on a hard drive. Unfortunately, over time personal computers may encounter software and/or hardware problems which destroy computer files stored on a hard drive. Unless the individual proactively and regularly performs backups of computer files located on the hard drive of their personal computer, important, difficult to replace, personal electronic documents may be lost due to a hardware or software problem. Even if the documents are backed-up on removable media such as a tape, portable disk or CD, the portable media itself may become corrupted, unreadable, obsolete, or lost. As a result, there exists a need for a system and method of storing important personal electronic documents which can preserve the integrity of the documents for long periods of time.

With the enactment of electronic signature laws at the state and federal levels, individuals are likely to encounter more opportunities to generate and electronically sign electronic documents. Many electronic signature systems use public key encryption methods to generate and validate electronic signatures. When signing an electronic document an individual uses a secret private key to generate a digital signature for the electronic document. Such a private key is generally associated with a public key. Another party may use the public key to authenticate the electronic document and digital signature. Such public keys are often distributed as part of a digital certificate which is digitally signed by a trusted third party certificate authority.

Although the digital certificate and public key may be publicly disclosed to the world, the private key must remain a secret to prevent forgeries. When a person wishes to digitally sign a document, the user must employ a computer program which has access to the private key. As with encryption software, many individuals do not have the technical skill to successfully install and use digital signature programs on their personal computers. Consequently there exists a need for a system and method of digitally signing electronic documents which can be easily employed by individuals.

In general, when a digital signature program belongs to a person using the program, that person may have reasonable assurance that the person's private key will be kept a secret by the program. In addition the person has reasonable assurance that the electronic document being signed corresponds to the electronic document that was read and reviewed by the person. Unfortunately, if the digital signing program belongs to an untrusted party, the individual has very little assurance that a private key inputted by the individual will remain a secret and/or that the electronic document that was read and reviewed by the individual is the actual document being digitally signed. As a result there exists a need for a system and method of protecting the confidentiality of private keys used to digitally sign electronic documents. There also exists a need to provide a system and method of digitally signing electronic documents which provides additional assurance to individuals that the process is a safe substitute for signing paper documents.

An exemplary embodiment of the automated banking machine may include at least one output device such as a display screen, audio system, and printer. The automated banking machine may also include at least one input device such as a touch screen, function keys, keypad, keyboard, and/or card reader. The automated banking machine may further include devices such as a dispenser mechanism for sheets of currency, a receipt printer mechanism, a card reader/writer, a depository mechanism and other transaction function devices that are used by the machine in carrying out transactions including transfers of value.

The automated banking machine may include or be in operative connection with at least one computer. The computer may be in operative connection with the output devices and the input devices, as well as with the transaction function devices in the machine. The computer may include software components and programs that are executed therein. In an exemplary embodiment, at least one software component may be operative to cause the computer to provide a user interface through the display device or other output device of the machine, which enables users to store and retrieve electronic documents from a digital safe deposit box or account associated with the user. In one exemplary embodiment a digital safe deposit account includes an amount of file storage space maintained by a storage server in operative connection with the automated banking machine. The exemplary automated banking machine is operative to communicate with the storage server and cause the storage server to maintain electronic documents which are stored in association with the user's digital safe deposit account. In one exemplary embodiment, the automated banking machine is operative to have the storage server store, retrieve, copy, and delete electronic documents stored in the user's digital safe deposit account. In addition the exemplary storage server is configured with operative hardware, software, and backup technology to preserve the integrity of the electronic files for long periods of time. Exemplary embodiments of the storage server are also operative to encrypt the electronic documents such that only authorized individuals may access the electronic documents.

Exemplary embodiments of the automated banking machine may enable a user to retrieve an electronic document from an external source and store the retrieved document in the user's digital safe deposit account. External sources for example may include a portable storage medium such as a CD, a portable computing device such as a mobile phone, and/or a network accessible storage location. In exemplary embodiments, the automated banking machine includes a portable storage medium reading device that is operative to read electronic documents from a portable storage medium. Examples of portable storage medium reading devices for use with exemplary embodiments include portable hard drive readers such as an Iomega Jaz® drive; magneto optical drives such as an Iomega Zip® drive; flash memory drives for writing to flash memory devices such as CompactFlash and Sony Memory Stick®; PC Cards Interfaces; CD drives, DVD drives; Mini-CD drives; smart cards; floppy disk drives; and digital tape drives.

The exemplary automated banking machine may further enable users to view and/or listen to the contents of electronic documents through an output device of the machine. The exemplary automated banking machine for example, may include document output software components which may be operative to cause the computer of the automated banking machine to output corresponding visual representations of the electronic documents through a display device of the automated banking machine. Examples of document output software components which may be operatively used with exemplary embodiments include an Adobe® PDF viewer, HTML or XML browser, a word processor, or any other software application which is operative to read or access an electronic document and output a visual representation of the accessed electronic document. The exemplary automated banking machine may further include document output software components that are operative to output audible representations of the electronic documents through an audio device of the automated banking machine. For example, electronic documents may include text which is both displayed through a display screen and converted into audible speech which is outputted through speakers of the automated banking machine. Also, the automated banking machine may further be operative to print a visual representation of the electronic document through a printer device.

In an alternative exemplary embodiment, users may have access to electronic documents stored in the digital safe deposit account through a public network such as the Internet. In one exemplary embodiment, users may be enabled to choose to add Internet access to their digital safe deposit account in addition to automated banking machine access to their digital safe deposit account. Users may or may not enable Internet access depending on the sensitivity and type of electronic documents stored in the digital safe deposit account.

An exemplary automated banking machine may be operative to digitally sign electronic documents. In one exemplary embodiment, the automated banking machine may include digital signature software components which are operative to sign electronic documents using public key cryptography algorithms and protocols, or other digital signature algorithm and protocol. For example, the exemplary digital signature software may be operative to sign electronic documents using a private key associated with the user. In one exemplary embodiment the private key may be stored by a storage server in association with a digital safe deposit account of the user. After authenticating the user, the exemplary automated banking machine may be operative to cause an electronic document to be digitally signed using the private key securely stored by the storage server. Once an electronic document has been caused to be signed by the exemplary automated banking machine, the automated banking machine may be operative to send the signed electronic document to a location of the user's choosing such as the digital safe deposit account associated with the user or an external source such as a portable storage medium, portable computing device and/or network accessible storage location.

In some exemplary embodiments, the exemplary automated banking machine may be operative to sign electronic documents with a private key of a user that is stored on an external source such as a portable computing device. For example, the private key of the user may be securely stored on a smart card. An exemplary embodiment of the automated banking machine may include a smart card reader which is operative to communicate with the smart card for purposes of signing an electronic document.

The exemplary storage server or an external source such as a smart card, may require a password or biometric data from the automated banking machine prior to enabling a digital signature to be generated using the private key of the user. The exemplary automated banking machine may include input devices such as a keypad or a biometric reading device which a user may use to input a required password such as a PIN, or biometric data.

In one exemplary embodiment, the automated banking machine may be operative to retrieve the private key from the storage server or an external device for purposes of generating the digital signature with the automated banking machine. In some exemplary embodiments, the system may be configured such that the automated banking machine does not require that the private key be retrieved by the automated banking machine. In this exemplary embodiment, the automated banking machine is operative to generate a one-way hash of the electronic document such as a message digest, cryptographic checksum, message integrity check, or manipulation detection code. The one-way hash may then be forwarded to the storage server, smart card, or other secure external source which has secure access to the private key. The storage server, smart card, or other secure external source may then generate a digital signature responsive to the one-way hash, private key and the appropriate encryption or digital signature algorithm. The storage server, smart card, or other secure external source may then return the digital signature to the automated banking machine. The automated banking machine may then attach the digital signature to the electronic document prior to storage in the digital safe deposit account or prior to sending the electronic document to an external source.

In an exemplary embodiment, the automated banking machine may forward the electronic document to the storage server, smart card, or other external source. In this embodiment the storage server, smart card, or other external source is operative to generate the digest and the corresponding digital signature from the received electronic document and then forward the digital signature and/or electronic document back to the automated banking machine. It is to be understood that exemplary embodiments encompass the use of any digital signature algorithm and key management system which is operative to enable an automated banking machine to securely sign electronic documents. Examples of cryptographic algorithms which may be used with an exemplary embodiment include RSA and DSA.

In some exemplary embodiments, the digital safe deposit account and/or a user's private key may be associated with a banking or other financial account of the user such as a checking account, savings account, debit account and/or credit account. A user may access the digital safe deposit account and/or digital signature features of the exemplary automated banking machine by inserting an automated banking machine card, bank card, credit card, or any other card which is associated with the user's financial account. After a user inputs a corresponding password such as a PIN or biometric information into an input device of the automated banking machine, the exemplary automated banking machine may be operative to enable the user to select transaction functions of the automated banking machine such as the dispensing of cash, transfers, deposits, bill payment, and balance inquiry. In addition the exemplary automated banking machine may be operative to enable the user to display and digitally sign electronic documents with a private key associated with the user's financial account. Further, the exemplary automated banking machine may be operative to enable the user to access and maintain electronic documents stored in a digital safe deposit account which is associated with the user's financial account.

In embodiments where a user's digital safe deposit account and/or private key is not associated with a financial account card, a user may be issued a digital safe deposit account card with machine readable indica thereon which corresponds to the user's digital safe deposit account. Automated banking machines of exemplary embodiments may be operative to enable a user to access his/her digital safe deposit account and sign electronic documents responsive to reading the machine readable indicia from the digital safe deposit account card.

In addition, the exemplary automated banking machine may be operative to enable a user to generate private and public keys for digitally signing electronic documents. Also, the exemplary automated banking machine may be operative to enable a user to acquire and/or purchase a digital certificate such as an X.509 certificate using the automated banking machine. The exemplary automated banking machine may be in operative connection with a certificate authority and may be operative to send the certificate authority sufficient information to enable the certificate authority to generate and issue the certificate to the user. Such digital certificates may be used to authenticate the user's digital signature created using the exemplary automated banking machine. The exemplary automated banking machine may be operative to store the digital certificate in the user's digital safe deposit account and/or in association with the user's financial account. As with other electronic documents, the exemplary automated banking machine may be operative to send the digital certificate to an external source of the user's choosing. When signing an electronic document, the exemplary automated banking machine may be operative to associate the digital certificate with the signed electronic document. Other parties may use the digital certificate to authenticate the digital signature of the electronic document. In this described exemplary embodiment, the automated banking machine may be operative to cause the costs associated with purchasing a digital certificate to be charged against the financial account of the user or another party. If the user already has a digital signature, an exemplary embodiment may be operative to retrieve the digital certificate from an external source selected by the user. The exemplary automated banking machine may be operative to associate a retrieved digital certificate with electronic documents being signed by the automated banking machine. The exemplary automated banking machine may further be operative to have the exemplary storage server store the retrieved digital certificate in the digital safe deposit account of the user and/or in association with a financial account of the user.

As discussed previously, the exemplary automated banking machine may be operative to read the electronic document and output through a display device of the automated banking machine a visual representation of the electronic document. In addition, the exemplary automated banking machine may further be operative to enable a user to input through an input device of the automated banking machine, information into the electronic document. For example, an electronic document such as a contract may include fields for entering the names of the contracting parties, a description of the goods, and an amount of consideration being paid for the goods. The exemplary automated banking machine may be operative to enable a user to input or select text, numbers, and other information for incorporation into the electronic document prior to signing the document. In addition exemplary embodiments of the automated banking machine may be operative to access a data store of user information. Such a data store may be used to retrieve information for automatically populating input fields of an electronic document being viewed and edited by the automated banking machine.

DETAILED DESCRIPTION OF EXEMPLARY EMBODIMENTS

Figure 1:
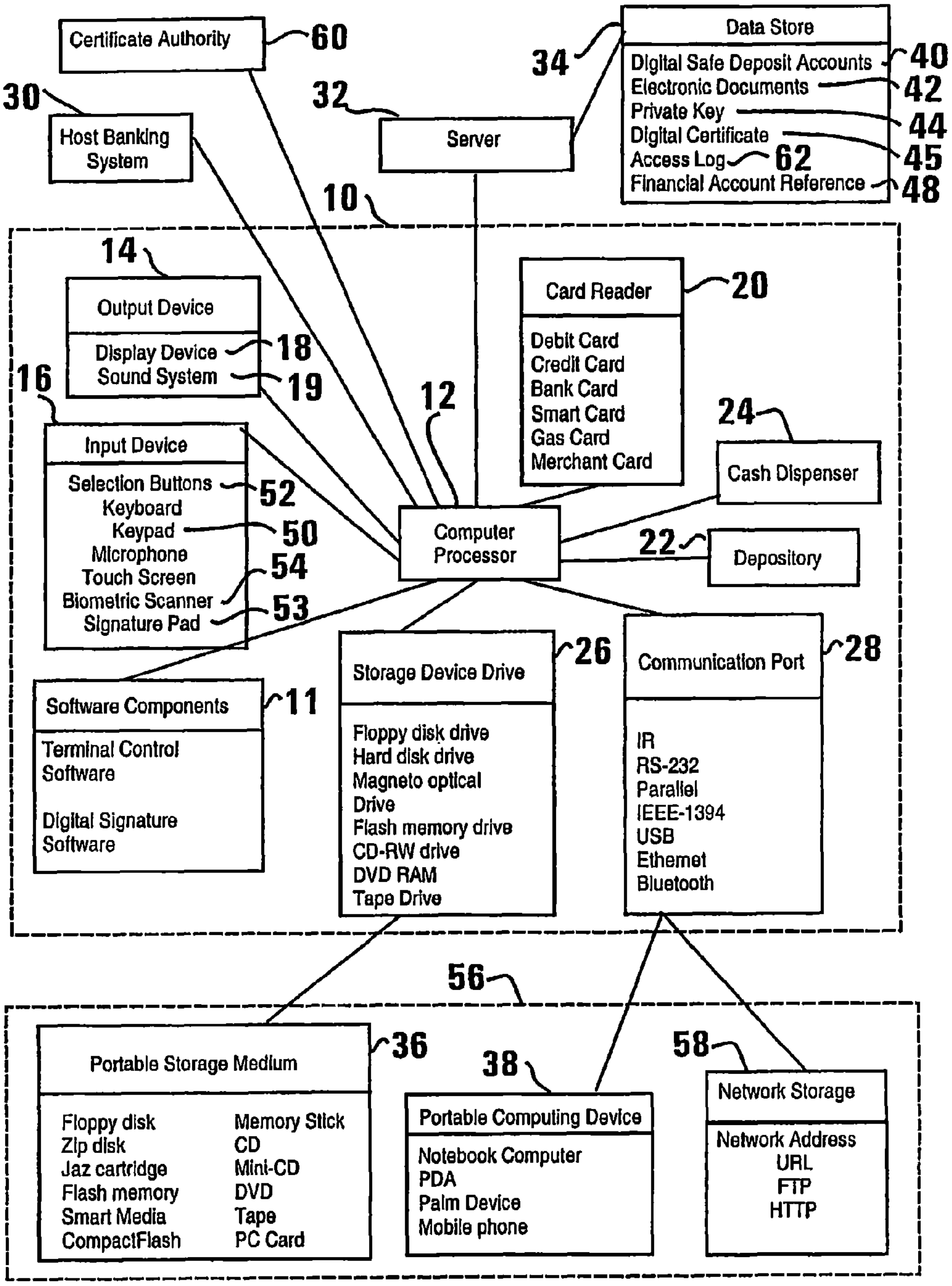
FIG. 1 is a schematic view representative of a first exemplary embodiment of an automated banking machine.

Referring now to the drawings and particularly to FIG. 1, there is shown therein a schematic view of an exemplary automated transaction machine, automated banking machine 10 of an exemplary embodiment. The automated banking machine 10 may include at least one computer processor 12 and a plurality of software components 11. The computer processor 12 may be operative responsive to the software components 11 to control the operation of the automated banking machine. In the exemplary embodiment the computer processor 12 may be operatively programmed to enable the automated banking machine to perform at least one of the following functions: at least one banking transaction such as the dispensing of cash; the storage and retrieval of electronic documents; and/or the digital signing of electronic documents.

To perform these functions the automated banking machine may further include in operative connection with the computer processor 12, at least one output device 14 such as a display device 18, at least one input device 16, and a card reader 20 which also serves as an input device. In some embodiments, the automated banking machine may also include in operative connection with the computer processor 12, one or more transaction function devices. Transaction function devices may include for example a cash dispenser 24, a depositor 22, a receipt printer 25 and other devices. The automated banking machine 10 may further be operative to communicate with at least one financial transaction processing computer or system which is operative to carry out financial transfers and authorizations, which in this example is host banking system 30. Automated banking machine 10 also may be enabled to communicate with at least one storage server 32. In the exemplary embodiment the storage server 32 may be in operative communication with at least one data store 34. Also in an exemplary embodiment, the automated banking machine 10 may be operative to communicate with the at least one storage server 32 through communication with the host banking system 30.

In one exemplary embodiment the storage server may be responsive to a plurality of automated banking machines 10 to securely store and maintain a plurality of electronic documents 42 in digital safe deposit boxes or accounts 40. Such digital safe deposit accounts may correspond to individual file storage locations on the data store 34. The electronic documents 42 may include for example digital representations of physical documents, word processing documents, HTML files, XML files, other markup language documents, Acrobat® PDF files, spreadsheet files, digital certificates, image files, sound files, audio visual files, source code files, application specific storage files, electronic voting ballets, or any other type of digital file which is operative to store information in a computer readable format. A user may establish one or more digital safe deposit accounts 40 and use an automated banking machine 10 to store and maintain electronic documents 42 in association with his/her digital safe deposit account.

The exemplary embodiment of automated banking machine 10 may be operative to display the viewable contents of an electronic document on the display device 18 and enable a user to digitally sign the electronic document. In many digital signature algorithms, the signer must use secret information such as a private key to generate the digital signature. In one exemplary embodiment, a user's private key 44, may be stored in a user's digital safe deposit account or stored in association with a user's digital safe deposit account 40. In exemplary embodiments, a user's private key 44 may further be stored in association with a user's financial account such as a credit card account, debit card account, checking account, savings account or any other financial account of the user. In addition, as will be further discussed below, exemplary embodiments of the automated banking machine 10 and/or storage server 32 may be operative to digitally sign electronic documents using the private key 44 associated with the user's digital safe deposit account 40 and/or a financial account.

It should be understood that the automated banking machine 10 is an exemplary embodiment and in other embodiments automated transaction machines may include other or additional devices and may operate in other types of systems. For example, embodiments may include in operative connection with the computer processor 12, a data store including a storage device drive 26, and a communication port 28 which serves as an input/output device. The storage device drive 26 serves as a data store and enables the computer processor to read and/or write electronic documents to an external source 56 such as portable storage medium 36. The communication port 28 enables the computer processor to read and/or write electronic documents to external sources 56 such as a portable computing device 38 or a network accessible storage location 58.

Figure 2:
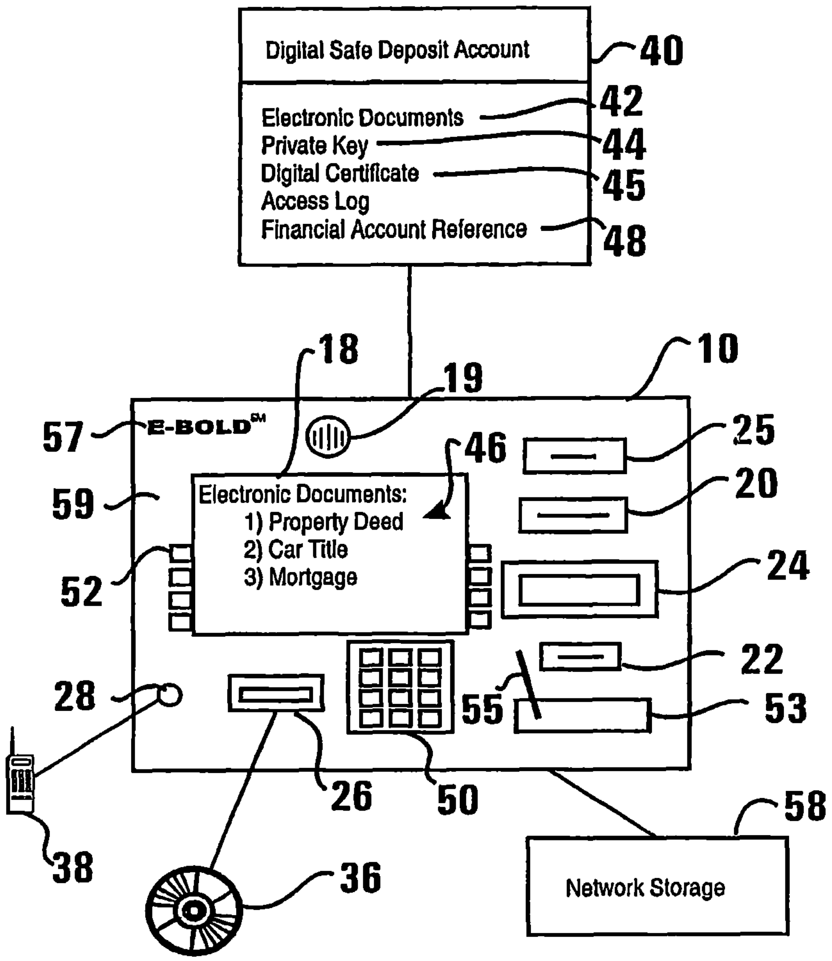
FIG. 2 is a schematic view representative of an exemplary embodiment of a system for storing and digitally signing electronic documents with an automated banking machine.

FIG. 2 schematically shows an exemplary embodiment of the automated banking machine 10 that may be operative to store and maintain electronic documents 42 in a digital safe deposit account 40. The exemplary embodiment of the automated banking machine 10 may include a display device 18 such as a CRT monitor or LCD display. The display device may be operative responsive to the computer processor to output user interface indicia 46. The user interface indicia may include instructional outputs for operating the automated banking machine as well as content indicia which are representative of lists of electronic documents that may be accessed by the automated banking machine 10 or portions of an electronic document which are operative to be viewed on the display device 18. Some exemplary embodiments may further include other output devices 14 such as a sound system 19 that is operative to output audio content that corresponds to an electronic document. For example when an electronic document includes audio information such as an MP3 file, an automated banking machine 10 may be operatively programmed to cause the sound system to output sound in response to the MP3 file. In addition, if the electronic document includes language information such as text, an exemplary embodiment may include a speech synthesizer device or software that is operative to read the language information to a user by outputting spoken words through the sound system of the automated banking machine 10.

The exemplary embodiment of the automated banking machine 10 may also include at least one input device 16 such as a keypad 50 or selection buttons 52. The input device(s) such as a keypad 50 and selection buttons 52 may enable users to enter operational inputs such as a personal identification number (PIN) corresponding to an account, an amount of cash to withdraw, or a selection of a particular electronic document to view, store and/or digitally sign. Some exemplary embodiments of the automated banking machine 10 may further include a biometric reading input device 54 such as a fingerprint reader, iris scanner, retina scanner, voice recognition device, facial recognition reader or other device which is operative to enable a user to input user identifying biometric information. Such identifying biometric information may be used by an exemplary embodiment of the automated banking machine 10 to further authenticate a user prior to enabling the user to perform transaction functions, access a digital safe deposit account, and/or digitally sign an electronic document.

In exemplary embodiments, the automated banking machine may include other or additional types of input devices for entering information, such as a touch screen device, a speech recognition system, a track ball, and/or a digitizing signature pad 53. The digitizing signature pad 53 is operative to produce a digital representation or scan of a handwritten signature drawn on the pad 53 with a pen or an inkless stylus 55. Such a digitized scan of the handwritten signature may be captured by the automated banking machine 10 and integrated into electronic documents that are digitally signed by the automated banking machine.

As discussed previously, the automated banking machine 10 may include a card reader 20. The card reader 20 may be operative to read indicia corresponding to account information or other information from a user's card. The card may be a bank card, credit card, debit card, gas card, merchant card, smart card, or other medium that is operative to store account data and/or other information which may be used to identify a user or their accounts. Such account data may include an account number of a checking, savings, debit, credit, or other banking or financial account. Such account data may further include data representative of a digital safe deposit account of the user.

In one exemplary embodiment, a digital safe deposit account, a private key 44, and/or a digital certificate 45 may be associated with a financial account 48 of the user. When the user uses the exemplary automated banking machine 10 with a card associated with the financial account 48, the exemplary automated banking machine may be operative to automatically provide the user with access to the user's associated digital safe deposit account 40, private key 44, and/or digital certificate. For example, when a user inserts a credit or debit card in the card reader 20, the exemplary automated banking machine may be operative to read the credit or debit account number from the card. This number may be used by the automated banking machine to access the financial account through communication with the host banking system 30. In one exemplary embodiment, the private key of the user may be directly associated with the financial account of the user and the automated banking machine is operative through communication with the host banking system to cause an electronic document to be digitally signed responsive to the private key associated with the financial account. In some embodiments, the user's digital safe deposit account 40 may be associated with the user's financial account 48 and the automated banking machine may be operative to receive access to the digital safe deposit account 40 through communication with the host banking system.

An exemplary embodiment of the automated banking machine 10 may be operative to dispense a selected amount of cash to the user from the cash dispenser 24, and to debit a banking or financial account through communication with a financial transaction computer such as the host banking system 30. The exemplary automated banking machine 10 may be configured to debit user fees from a financial account of the user for storing, viewing, and digitally signing electronic documents with the automated banking machine. The automated banking machine may further be configured to debit user fees from a financial account of a further party or entity which may be associated with the electronic document being viewed, stored, and/or digitally signed by the automated banking machine.

The exemplary embodiment of the automated banking machine 10 may include a storage device drive 26 such as a CD drive which is operative to accept a portable storage medium 36 such as a read-only, write-once or rewriteable CD. The exemplary embodiment of the automated banking machine 10 is operative to cause the storage device drive 26 to read electronic documents from the portable storage medium 36. The read electronic documents may be viewed on the display screen 18 of the automated banking machine 10 and/or transferred to a digital safe deposit account 40. In addition the exemplary automated banking machine may further be operative to retrieve electronic documents stored in the digital safe deposit account 40, view them on the display device 18 and/or cause the storage device drive 26 to record the electronic document to the portable storage medium 36. Examples of other types of storage device drives that may be used with embodiments include portable hard drive readers such as an Iomega Jaz® drive; magneto optical drives such as an Iomega Zip® drive; flash memory drives for writing to flash memory devices such as CompactFlash and Sony Memory Stick®; DVD drives, Mini-CD drives, and digital tape drives.

Some embodiments may include one or more communication ports 28 that are operative to retrieve and record electronic documents to a portable computing device such as a mobile phone 38 or a network accessible storage location 58 associated with a customer selected or inputted URL, e-mail address, or other network address. Examples of suitable communication ports 18 may include a Universal Serial Bus (USB) port, a serial RS-232 port, parallel port, an infrared (IR) port, a radio frequency (RF) port such as Bluetooth, an IEEE-1394 port, or a network port such as a wired Ethernet or wireless Ethernet (IEEE-802.11x) connection. Examples of other types of portable computing devices that may be accessed with embodiments of the automated banking machine 10 include a portable computer such as a notebook computer and a personal digital assistant (PDA).

The exemplary embodiment of the automated banking machine 10 may further include a fascia 59 through which the one or more of the input devices, display devices, and transaction function devices are accessible to a user. The automated banking machine 10 may further include a visible indicia 57 adjacent the fascia 59 of the automated banking machine, visible on the display screen or otherwise communicated to a user of the machine. The visible indicia 57 may include a logo, design, or text that serves as a source indicator mark for a digital signature service or network. Such a mark may correspond to a service mark of the entity that operates the servers, data stores, host systems, and/or network through which the automated banking machine 10 communicates to produce electronic signatures for an electronic document displayed by the automated banking machine 10. Such indicia may be visually similar to indicia on a card of the user, so that the user can quickly determine that the automated banking machine is capable of digitally signing documents using the card of the user. Such indicia may also serve to confirm to the user that the automated banking machine is associated with a third party and independent digital signature service or network that can be trusted to accurately display the electronic document and to securely digitally sign the electronic document for the user.

Figure 3:
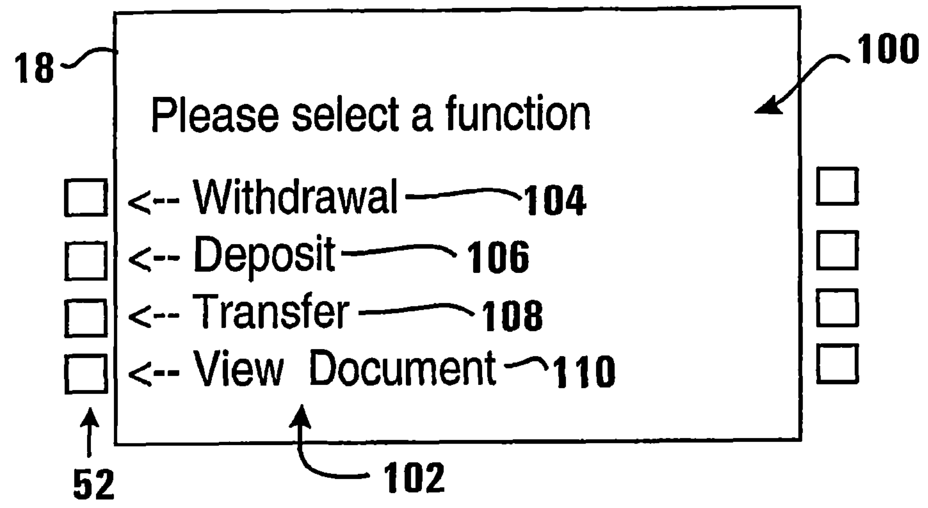
FIGS. 3-8 are schematic views representative of exemplary embodiments of user interface screens of an automated banking machine.

FIGS. 3-8 show examples of user interface screens of an exemplary embodiment of the automated banking machine 10. FIG. 3 shows an example of a user interface screen 100 which automated banking machine 10 may be operative to cause to be output through the display device 18. In one exemplary embodiment user interface screen 100 may be displayed after a user activates the automated banking machine 10 by placing a card into card reader 20 and inputting a PIN into the keypad 50. User interface screen 100 may include a plurality of user selectable functions 102 which include the option of withdrawing cash 104 from the cash dispenser 24; the option of depositing a check 106 with the depositor 22; the option of transferring value between accounts 108; and the option of viewing an electronic document 110 with display device 18. Each of these selectable functions 102 may be adjacent a different selection button 52, which when pressed are operative to cause the automated banking machine 10 to proceed with the corresponding function 102.

Figure 4:
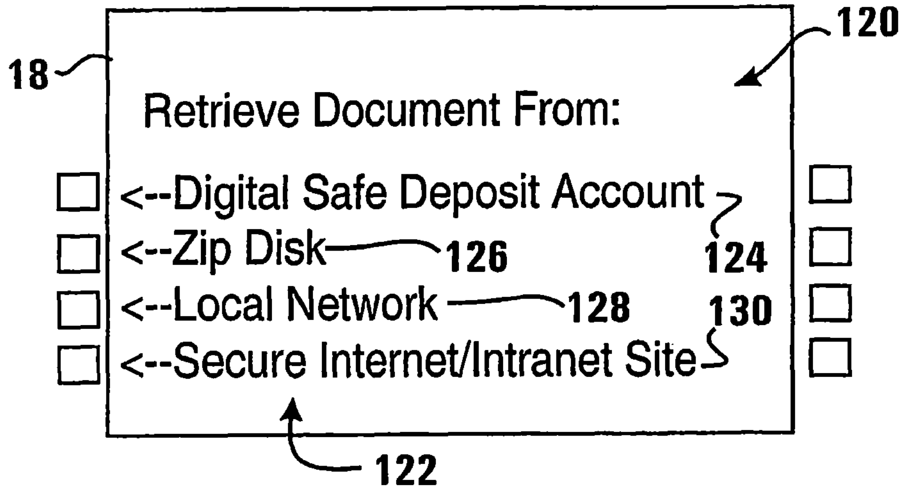

In one exemplary embodiment, when a user selects the option to view an electronic document 110, the exemplary automated banking machine 10 may be operative to cause the user interface screen 120 shown in FIG. 4 to be output through the display device 18. Here the user interface screen 120 may include a plurality of selection functions 122 which correspond to different sources for retrieving electronic documents to view. In the presently described example, selection functions 122 may include the option to select electronic documents from a digital safe deposit account 124; the options 126-130 for selecting electronic documents from the external sources of a zip disk, local network which may include portable computing devices such as the user's PDA, and a secure internet/intranet site.

Figure 5:
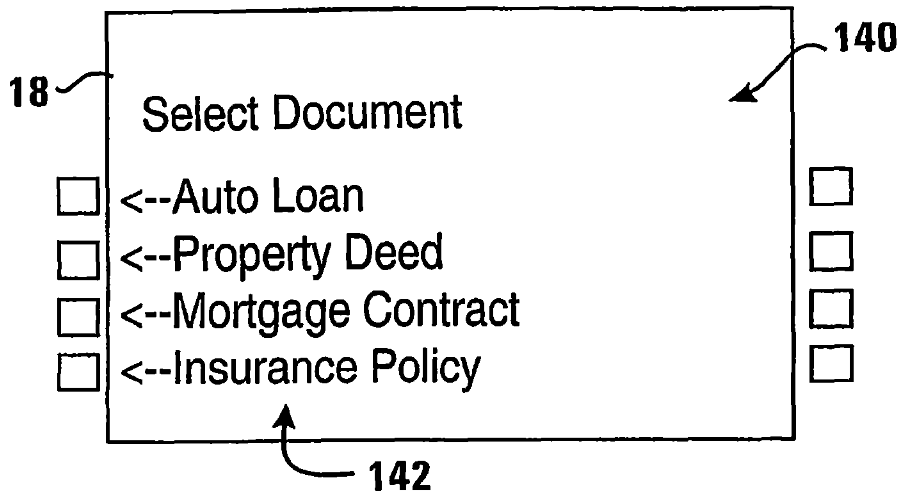
Figure 6:
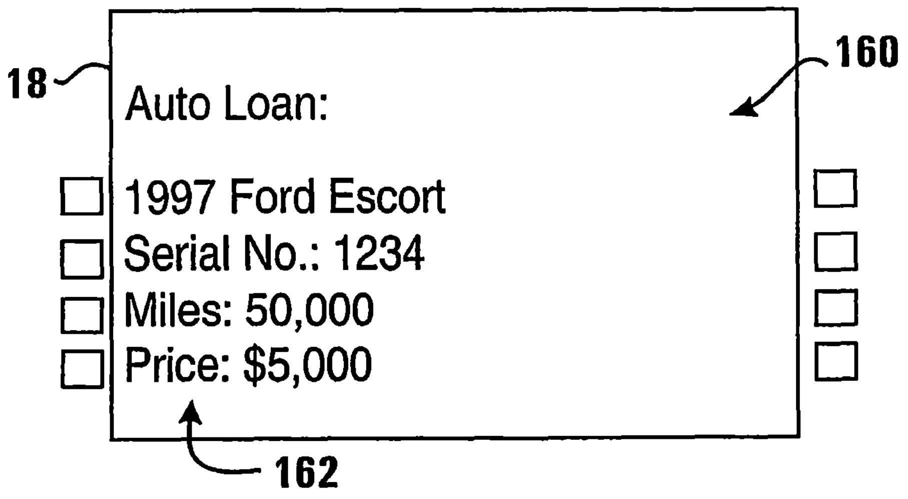

In response to a user selecting one of these electronic document sources, an exemplary embodiment of automated banking machine 10 may be operative to cause the output of the user interface screen 140 shown in FIG. 5. The user interface screen 140 may include a listing of electronic documents 142 that the automated banking machine 10 has determined are present at the electronic document source selected with user interface screen 120. In response to a user selecting one of the listed electronic documents 142, an exemplary embodiment of the automated banking machine 10 may be operative to cause the selected electronic document to be viewed through the display screen 18. FIG. 6 is representative of an example of a user interface screen 160 which includes indicia representative of a selected automobile loan electronic document 162.

Exemplary embodiments of the automated banking machine 10 may further include functionality for enabling the user to edit the displayed electronic document 162. For example in one exemplary embodiment, the automated banking machine 10 may include software components for displaying through the output device 18 electronic documents which include HTML, DHTML, XML, Active X, .Net objects, plugins, Java script, and/or Java applets associated with the electronic document. Such features may generate input or selection fields on the display device, which can be completed or modified by operating the input devices of the automated banking machine 10.

To further aid a user with the completion of fields in an electronic document, an exemplary automated banking machine may further be operative to retrieve relevant information for completing input fields of an electronic document from a data store of stored user information. The stored user information may be associated with the user's financial account and/or digital safe deposit account. The exemplary automated banking machine may use the stored user information to automatically complete input fields of an electronic document. For example, the electronic document may include an input field labeled "ship_to_address." The stored user information may include address information which is associated with the description "ship_to_address." The exemplary automated banking machine may be operative to retrieve matching user information from the data store and insert the matching user information in the input fields of the electronic document. When the user manually inputs information into an electronic document, exemplary embodiments of the automated banking machine may further be operative to store the inputted information in the digital safe deposit account or other data store for later use with completing similarly labeled fields.

Figure 7:
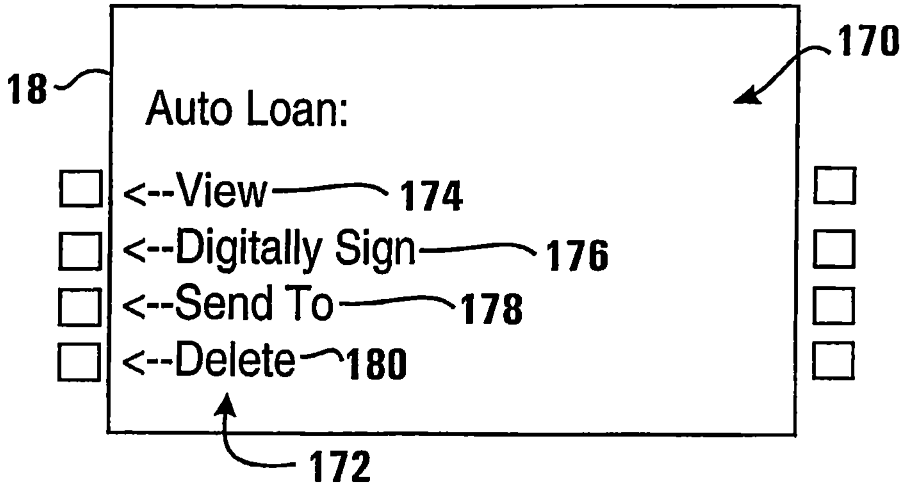

Once a user has completed reviewing and/or editing an electronic document, the exemplary embodiment of the automated banking machine 10 may be operative to display a further user interface screen 170 as shown in FIG. 7. User interface screen 170 may include a plurality of selectable functions 172 including the option to review the electronic document 174; the option to digitally sign the electronic document 176; the option to send the electronic document to another location 178; and the option of deleting the electronic document 180. In the described embodiment of automated banking machine 10, the option to delete an electronic document 180 may be generally available when viewing an electronic document located in the user's digital safe deposit account.

When a user selects the option to digitally sign an electronic document 176, the exemplary embodiment of the automated banking machine 10 may be operative to have a digital signature generated and attached to either the original or a copy of the electronic document. Exemplary embodiments may be operatively programmed to generate a digital signature using any digital signature algorithm and protocol. Examples of digital signature cryptography algorithms available for use with the embodiments may include RSA and DSA. In the exemplary embodiment an electronic document may be signed using a private key associated with the user. The digital signature may be verified at a later time by using a public key of the user which corresponds to the private key. Such a public key may be retrieved from a digital certificate of the user. In exemplary embodiments, the automated banking machine may be operative to cause the digital certificate associated with the user to be attached to the electronic document when the electronic document is digitally signed. Also the automated banking machine may be operative to cause the digital certificate associated with the certificate authority that signed the user's digital certificate to be attached to the electronic document.

Figure 19:
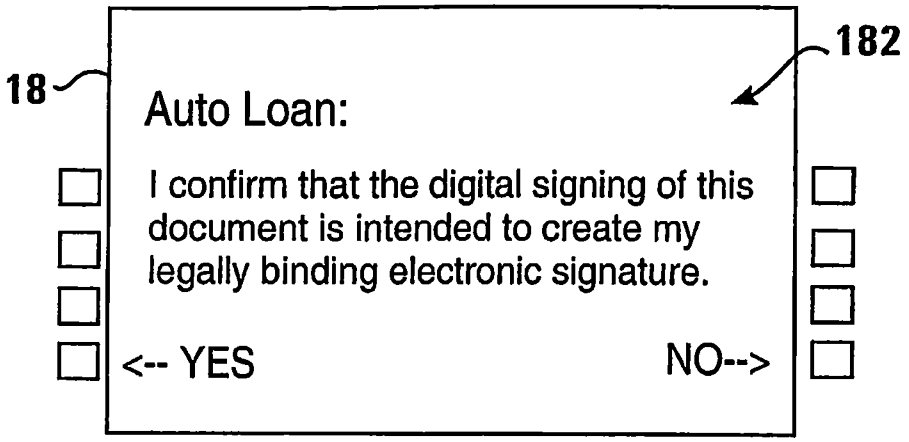
FIG. 19 shows an exemplary embodiment of a user interface screen of an automated banking machine.

For a digital signature to correspond to a legally binding signature of the user, the user may need to show his/her manifestation of intent to use a digital signature as a legally binding electronic signature. As a result, exemplary embodiments of the automated banking machine 10 may provide additional user interface screens which require a user to affirmatively show such a manifestation of intent to create a legally binding electronic signature. For example, as shown in FIG. 19, the automated banking machine may output a user interface screen 182 which prompts the user to make an affirmative confirming input with an input device, that represents the intent of the user to create a legally binding electronic signature.

Some exemplary embodiments of the automated banking machine 10 may cause a declaration to be attached to the electronic document that includes a statement that the user has affirmatively shown his intent to create a legally binding electronic signature with the generation of the digital signature. The automated banking machine 10 may further cause such a statement and/or the entire electronic document to be digitally signed or digitally notarized by a further entity which affirms that the user provided an input to the automated banking machine which represents the user's intent to create a legally binding electronic signature. The declaration and/or the electronic document may also be associated with a digital time stamp representative of the time the intent of the user was shown and/or when the digital signature was created. Such a digital time stamp may be obtained by the automated banking machine communicating with a digital time stamping server.

In some exemplary embodiments, the automated banking machine 10 may prompt the user to handwrite his/her signature on a digitizing signature pad. The automated banking machine 10 may generate a digitized representation or scan of the handwritten signature in the form of a bitmap or vector drawing. The digitized representation of the written signature may then be incorporated into the electronic document by the automated banking machine. A displayed or printed view of the electronic document may then include a visual representation of the customer's written signature.

Figure 8:
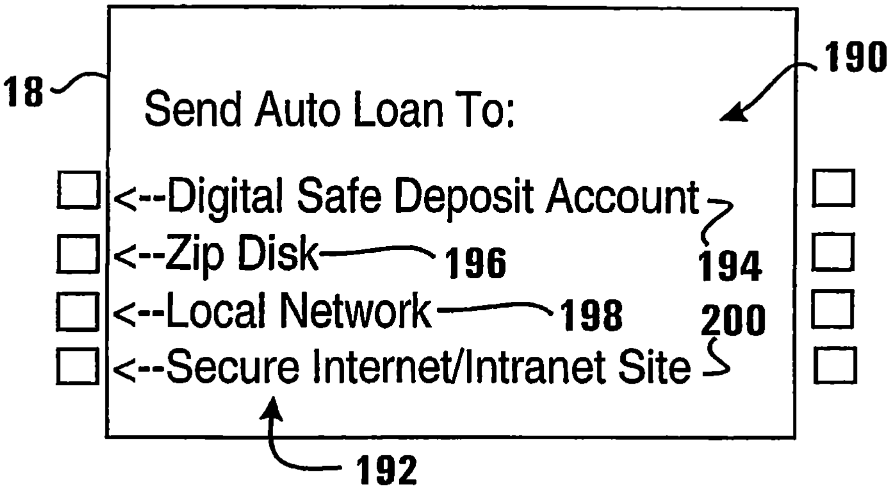

When a user selects the option of sending an electronic document to another location 178, one exemplary embodiment of the automated banking machine 10 may be operative to generate the user interface screen 190 as shown in FIG. 8. User interface screen 190 may include a plurality of selection functions which correspond to different locations 192 to send a copy of the original or signed electronic document. In the presently described example, the selection functions 192 may include the option to send the electronic document to the digital safe deposit account 194, the options 196-200 to send the electronic document to the external sources of a zip disk, local network, and a secure internet/intranet site.

In one exemplary embodiment, the digital safe deposit account is associated with the private key of the user. In such embodiments the exemplary automated banking machine 10 may include further user interface screens which enable a user to generate a private and public key set which may be associated with and/or stored in the user's digital safe deposit account. The private key may be used by the exemplary embodiment to sign electronic documents for the user.

Referring back to FIG. 1, exemplary embodiments of the automated banking machine 10 may further be in operative connection with a certificate authority 60. The exemplary automated banking machine 10 may be operative to communicate with a certificate authority for purposes of creating a digital certificate such as an X.509 certificate which may be attached to the electronic document for purposes of authenticating the digital signature created by a user. The exemplary automated banking machine 10 may be operative to send the certificate authority information which identifies the user and a copy of the user's public key. In response, the certificate authority may be operative to generate and return a signed digital certificate which includes the identifying information and the user's public key. The digital certificate may then be attached to the electronic document by the automated banking machine 10, stored in association with or in the user's digital safe deposit account and/or sent to an external source selected by the user. The automated banking machine 10 may also receive a copy of the digital certificate associated with the certificate authority that issued and signed the user's digital certificate. Such a digital certificate of the certificate authority may also be attached to the electronic document, stored in association with or in the user's digital safe deposit account and/or sent to an external source selected by the user.

Figure 9:
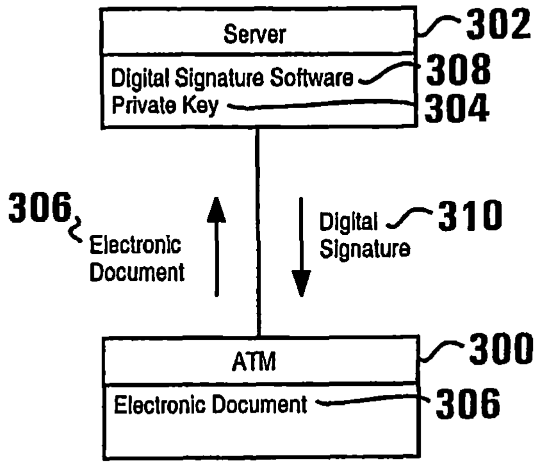
FIGS. 9-14 are schematic views representative of exemplary embodiments of automated banking machine systems for digitally signing documents.

FIGS. 9-14 are schematic views of a plurality of different embodiments. FIG. 9 shows an exemplary embodiment of an automated banking machine 300 that may be operative to communicate with one exemplary embodiment of a storage server 302. Here the storage server may be operative to securely store private keys 304 associated with a plurality of different users. The exemplary private keys may be stored in association with digital safe deposit accounts and/or financial accounts such as a checking or savings account. In this described embodiment the automated banking machine 300 may be operative to send an electronic document 306 associated with a user using the automated banking machine 300 to the storage server 302. The storage server includes digital signature software 308 which may be operative to generate a digital signature 310 for the electronic document 306 using the private key 304 associated with the user. The storage server may then attach the digital signature to the electronic document and return the signed electronic document to the automated banking machine 300 or the storage server may only send the digital signature 310 to the automated banking machine 300. The exemplary automated banking machine 300 may then attach the digital signature 310 to the electronic document 306 and forward the signed electronic document to a selected destination location chosen by the user.

In the exemplary embodiment, the digital signature software may include the RSA algorithm. However in some exemplary embodiments, the digital signature software may include other or additional digital signature software/hardware. In embodiments where the server includes more than one type of digital signature software/hardware, the exemplary automated banking machine 300 may be operatively programmed to enable users to select the type of digital signature they would like the automated banking machine to generate for the electronic document.

Figure 10:
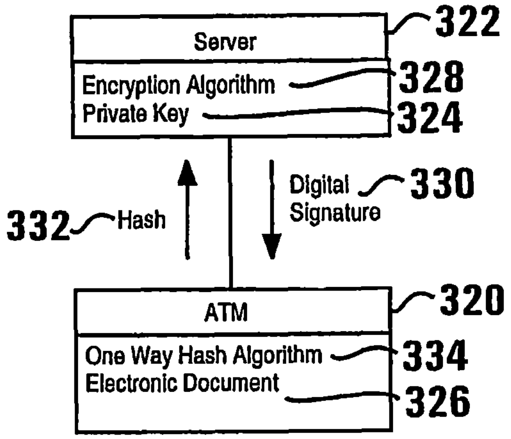

FIG. 10 shows an exemplary embodiment of an automated banking machine 320 that may be operative to communicate with an exemplary embodiment of a storage server 322. Here the storage server 322 may also be operative to securely store private keys 324 associated with a plurality of different users. However, in this described embodiment, rather than sending the storage server 322 a complete copy of the electronic document 326, the exemplary automated banking machine 320 may be operative to generate and send the storage server 322 a one-way hash 332 of the electronic document 326. The exemplary automated banking machine 320 may include one or more one-way hash algorithms 334 which correspond to the digital signature protocols which the user wishes to use for signing his electronic document. For example, for generating digital signatures, exemplary one-way hash algorithm 334 of automated banking machine 320 may include the one-way hash functions MD5 or SHA.

Here the storage server 322 may include one or more encryption and/or digital signing algorithms 328 such as RSA which are operative to generate a digital signature 330 for the electronic document 326 using the one-way hash 332 and the private key 324 associated with the user. The storage server may then return the digital signature 330 to the automated banking machine 320 and the automated banking machine 320 may attach the digital signature 330 to the electronic document 326.

Figure 11:
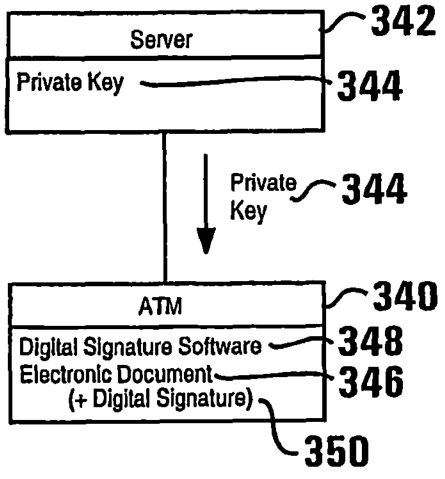

FIG. 11 shows an exemplary embodiment of an automated banking machine 340 that may be operative to communicate with an alternative exemplary embodiment of a storage server 342. Here the storage server 342 may also be operative to securely store private keys 344 associated with a plurality of different users. However, in this described embodiment, the storage server 342 may be operative to securely send a private key of a user to the automated banking machine 340. The exemplary automated banking machine 340 may include digital signature software 348 which is operative to cause the automated banking machine 340 to generate a digital signature 350 for an electronic document 346 of the user operating the automated banking machine 340.

Figure 12:
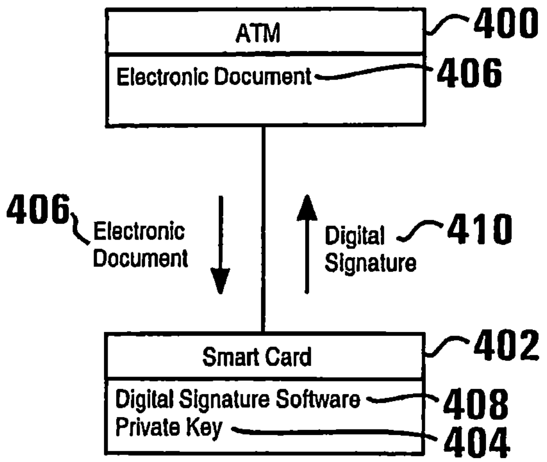

FIG. 12 shows an exemplary embodiment of an automated banking machine 400 that may be operative to communicate with a portable computing device 402 associated with a user such as a smart card, PDA, or mobile phone. Here the portable computing device 402 may include at least one private key 404 associated with the user. In this described embodiment, after the user has viewed an electronic document 406 associated with the user, the automated banking machine 400 may be operative to send the electronic document 406 to the portable computing device 402. The exemplary portable computing device may include digital signature software 408 which is operative to generate a digital signature 410 for the electronic document 406 using the private key 404 stored on the portable computing device. The portable computing device 402 may then attach the digital signature 410 to the electronic document 406 and return the signed electronic document to the automated banking machine 400 or the portable computing device may only send the digital signature 410 to the automated banking machine 400. The exemplary automated banking machine 400 may then attach the digital signature 410 to the electronic document 406 and forward the signed electronic document to a selected destination location chosen by the user.

Figure 13:
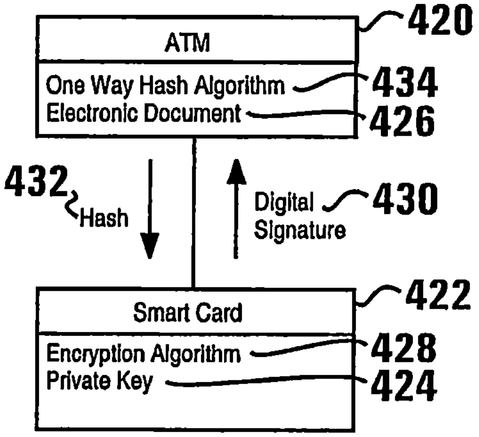

FIG. 13 shows an exemplary embodiment of an automated banking machine 420 that may be operative to communicate with a portable computing device 422. Here the portable computing device 422 may also include at least one private key 424 of the user. However, in this described embodiment, rather than sending the portable computing device 422 a complete copy of the electronic document 426, the exemplary automated banking machine 420 may be operative to generate and send the portable computing device 422 a one-way hash 432 of the electronic document 426. The exemplary automated banking machine 420 may include one or more software components with one-way hash algorithms 434 that correspond to the digital signature protocols which the user wishes to use for signing his electronic document 426. Using the one-way hash algorithms 434, the automated banking machine 420 may be operative to produce a one-way hash 432 of the electronic document 426 and forward the one-way hash 432 to the portable computing device 422.

The exemplary portable computing device 422 may include one or more encryption and/or digital signing algorithms 428 which are operative to generate a digital signature 430 for the electronic document 426 using the one-way hash 432 and the private key 424 associated with the user. The portable computing device 422 may then return the digital signature 430 to the automated banking machine 420 and the automated banking machine 420 may attach the digital signature 430 to the electronic document 426.

Figure 14:
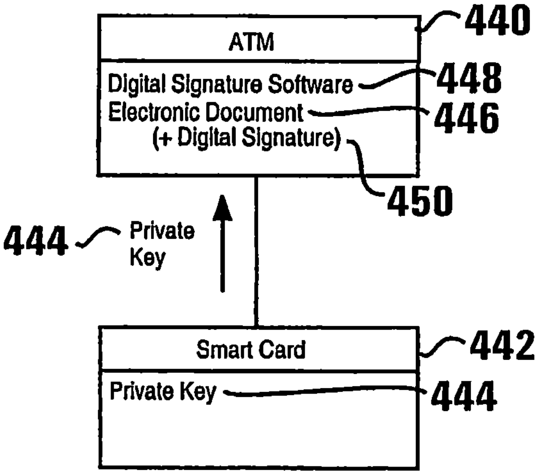

FIG. 14 shows an exemplary embodiment of an automated banking machine 440 that may be operative to communicate with an exemplary portable computing device 442. Here, the portable computing device 442 may include at least one private key 444 of the user. However, in this described embodiment, the portable computing device 442 may be operative to securely send the private key 444 of a user to the automated banking machine 440. The exemplary automated banking machine 440 may include digital signature software 448 which is operative to cause the automated banking machine 440 to generate a digital signature 450 for an electronic document 446 of the user operating the automated banking machine 440.

Referring back to FIG. 1, the exemplary storage server 32 may be operative to maintain an access log 62 in association with the digital safe deposit account 40 and/or the financial account 48 of the user. The exemplary storage server 32 may be operative to store in the access log 62 a record of each attempted access of a user's digital safe deposit account 40 and/or use of the private key 44. If an imposter gains access to a user's digital safe deposit account and/or private key, the exemplary access log may be used to determine when and where the unauthorized access occurred. The exemplary access log may further include a record of which electronic document was signed by the system. The record for example may include the one-way hash of the electronic document. If an imposter uses the present exemplary system to digitally sign an electronic document, the access log may be reviewed to determine what document may have been forged.

Some exemplary embodiments of the automated banking machine may be operative to encrypt electronic documents stored in the digital safe deposit account using a symmetrical encryption algorithm such as DES and a secret key. The exemplary automated banking machine may be operative to enable a user to generate a secret key for encrypting electronic documents from a password or from biometric information inputted by the user into the automated banking machine. To decrypt the electronic documents, the exemplary automated banking machine may be operative to regenerate the secret key by prompting the user to re-enter the password and/or biometric data.

In addition to causing an electronic document to be signed, an alternative exemplary embodiment of an automated banking machine may be operative to digitally sign, notarize and/or cosign an electronic document using a private key associated with the automated banking machine, storage server, digital signature service/network, or a third party. For example, in addition to enabling a user to digitally sign an electronic document using his private key, the exemplary automated banking machine may also cause the electronic document to be further digitally signed using a further private key not associated with the private key of the user. Such a further private key may be associated with an authorized notary public, a digital signature service, or another party to a transaction which is associated with the electronic document. The exemplary automated banking machine may further attach the digital certificate associated with the further private key to the signed electronic document. Such a digital certificate can be used to verify the authenticity of the second digital signature. Also the digital certificates associated with the certificate authorities which issued and signed either or both of the user's digital certificate and a digital certificate of the notary public or other party may also be attached to the electronic document.

In an exemplary embodiment, the automated banking machine may be operative to attach a digital time stamp to the electronic document by including the current date and time in the electronic document prior to the electronic document being digitally signed by the user of the automated banking machine. In some exemplary embodiments, the automated banking machine may be operative to cause an electronic document to be digitally time stamped by a document time stamping entity or server. For example, the exemplary automated banking machine may send a one-way hash of the electronic document to a time stamping entity. That time stamping entity would be operative to attach time data representative of the date, time and time zone at which the time stamping entity received the one-way hash. The time stamping entity may then digitally sign the one-way hash and time data with a private key of the time stamping entity to form a digital time stamp. This digital time stamp may then be returned to the automated banking machine along with a digital certificate of the time stamping entity. The automated banking machine may then attach the digital time stamp and the digital certificate of the time stamping entity to the electronic document. In some embodiments, the digital time stamping entity may correspond to the same entity, service, or network that is operative to produce the digital signature for the user of the automated banking machine.

Figure 15:
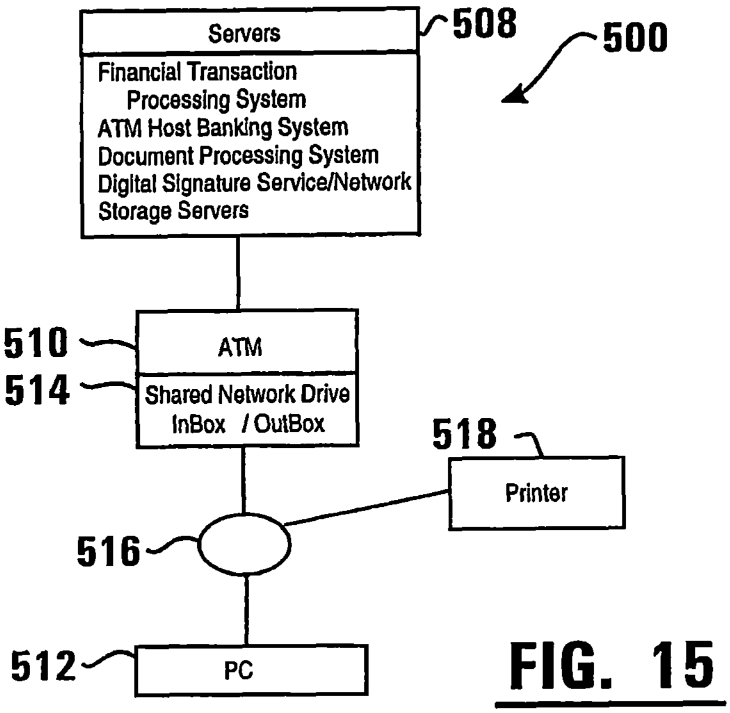
FIG. 15 shows a schematic view of a document signing system of a further exemplary embodiment.

FIG. 15 shows an example of a document signing system of one exemplary embodiment. Here the system 500 may include at least one automated banking machine 510 that is operative to display and digitally sign electronic documents. The automated banking machine 510 may further be operative to communicate with one or more servers 508 including servers associated with a financial transaction processing system, host banking system, document processing system, or a digital signature service or network.

In addition the automated banking machine 510 may be operative to receive electronic documents from at least one personal computer (PC) 512 or other computing devices through a wired or wireless network 516. In this described embodiment, automated banking machine 510 may include or be in operative connection with a shared or externally accessible network drive 514 that is operative to store incoming and outgoing electronic documents. Such a shared network drive may be segregated into one or more locations such as an "in-box" and an "out-box" storage area.

The PC 512 may selectively be given permission to access the shared network drive 514 or a portion of the shared network drive such as an "in-box" associated with the automated banking machine 510. Electronic documents created by the PC 512 may then be saved, exported and/or sent to the shared network drive 514 of the automated banking machine 510. A user operating the automated banking machine 510 may select commands of the automated banking machine which cause the automated banking machine to display and digitally sign electronic documents stored in the shared network drive 514. Digitally signed versions of the electronic document may then be saved, exported, or sent to the shared network drive 514 or a portion of the shared network drive such as an "out-box" of the shared network drive 514. The PC 512 or another computing device may then retrieval the signed document from the shared network drive 514. The automated banking machine 510 may also be in operative connection with a printer 518 and may include selectable options for printing the digitally signed electronic document to the printer.

Figure 16:
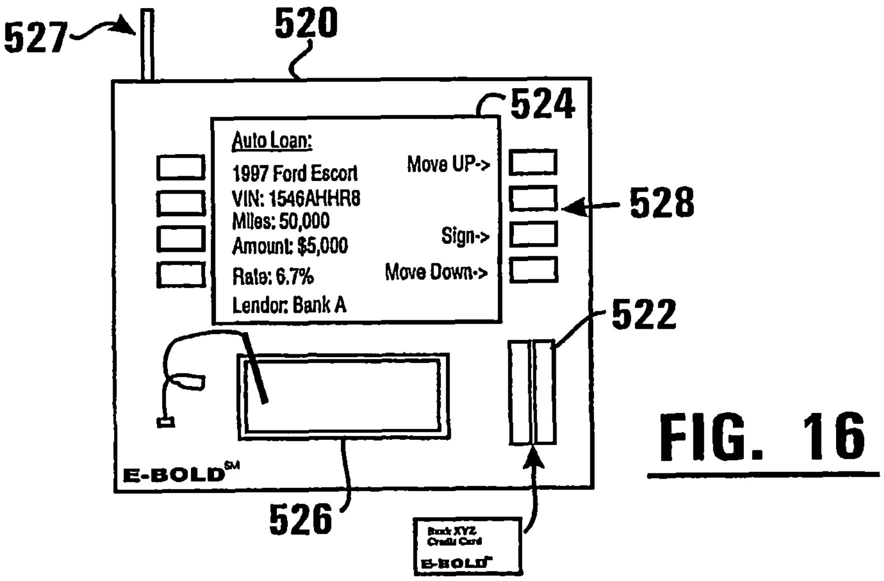
FIG. 16 shows a top plan view of an exemplary embodiment of a portable machine that is operative to digitally sign electronic documents.

Exemplary embodiments of the automated banking machine 510 may include transaction function devices such as a cash dispenser and a depository device which enable the automated banking machine to perform other types of transaction functions such as the dispense of cash and the deposit of checks. However, some exemplary embodiments of the automated banking machine 510 may be configured in a different form such as a portable form which does not dispense cash or receive deposited checks. An example of such a portable form of an automated banking machine is shown in FIG. 16. Here the exemplary embodiment of the portable automated banking machine 520 may include a magnetic swipe card reader 522 or other card reader, a display screen 524, and a digitizing signature pad 526. The exemplary automated banking machine 520 may further include function keys 528 for providing inputs to the automated banking machine. Further exemplary embodiments of the display screen 524 may include a touch screen for providing inputs to the automated banking machine and a communication device 527 such as a wireless or wired network interface.

Referring back to FIG. 15, the exemplary embodiment of the automated banking machine 510 may be used by organizations which wish to offer users the ability to safely and securely digitally sign electronic documents. Such organizations may include banks, mortgage companies, title companies, S&Ls, insurance companies, car dealerships, leasing companies, universities, hospitals, government agencies, or any other organization that generates documents which require signatures by their customers. The exemplary automated banking machine 510 provides the customers or clients of the organization or other users with a convenient method to view and digitally sign electronic documents.

Figure 17:
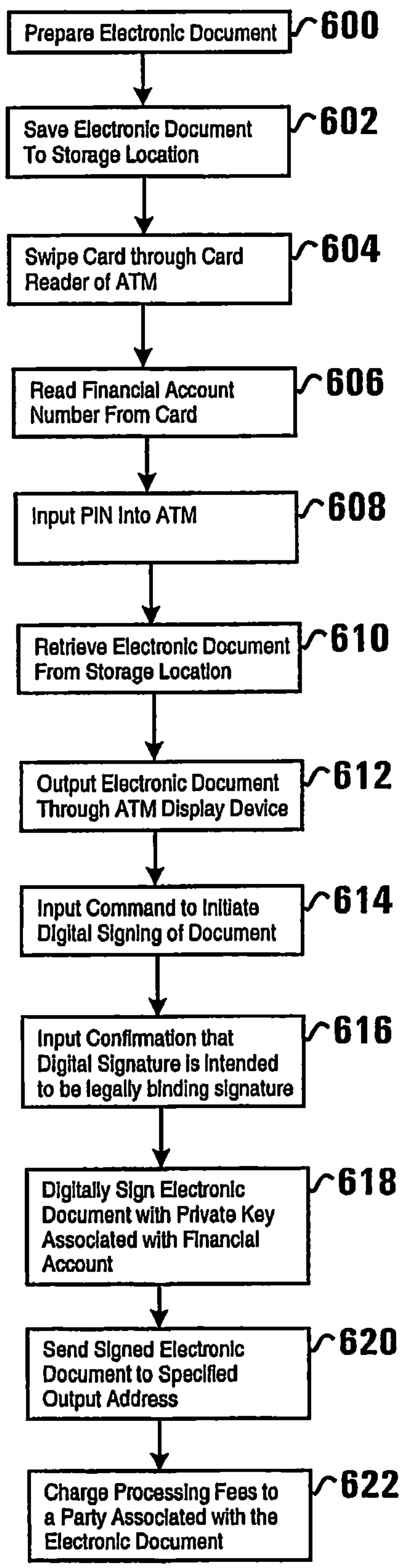
FIG. 17 shows steps for an exemplary embodiment of a method for signing electronic documents.

FIG. 17 shows exemplary steps involved with the operation of the system 500. Here the method steps are described with respect to a car dealership; however, it is to be understood that the exemplary steps may also apply to any organization, entity, group or individual that wishes to have users digitally sign electronic documents. The method may begin in step 600 with a finance manager or other member of the organization preparing electronic documents which correspond to a car loan. Such an electronic document may include a word processing document, an Acrobat® PDF document, eXtensible Markup Language (XML) document, or any other type of document which may electronically represent a car loan.

In an exemplary embodiment, the electronic document may conform to a standardized loan format. Such a format may include standardized XML tags which describe information about the Lendor, Lendee, and terms of the loan. Such tags may include for example the names and addresses of the parties, the loan amount, the loan duration, the interest rate and any other term or category of information that may be part of the loan. Once the document is created, the finance manager in step 602 may save the electronic document to a storage location that is accessible to the automated banking machine. For example, the finance manager may save the electronic document to the "in-box" associated with the automated banking machine.

In busy organizations which may process loan applications concurrently, multiple automated banking machines may be available for saving the electronic document. In such cases, the shared network drive may be associated with the name or identification of the particular automated banking machine which is operative to access the electronic document from the shared network drive. Once the electronic document is saved to the storage location, the finance manager may direct the customer to begin using the particular automated banking machine which is operative to retrieve the electronic document.

Once the customer has access to the automated banking machine, the customer may follow the instructions displayed through the display screen of the automated banking machine. If the customer already has a digital safe deposit account, digital certificate, and/or private key associated with a financial account, the customer may be prompted by the automated banking machine to insert or swipe a card that is associated with the digital safe deposit account, digital certificate, and/or private key. For example if the customer has a checking account or a credit card which is associated with a digital safe deposit account, the customer may in step 604 insert or swipe his/her checking automated banking machine card or credit card within the card reader of the automated banking machine.

In response, the automated banking machine may be operative to read the financial account number associated with the card in step 606 with the card reader and request that the customer input a PIN. In step 608 the customer may input a PIN through a keypad or through a touch screen which may be configured to display a visual representation of a keypad. In one exemplary embodiment, the PIN may correspond to the 4 digit PIN associated with the customer's financial account. In other exemplary embodiments, the PIN may correspond to a different password stored in association with the customer's digital safe deposit account, digital certificate, and/or private key. Such a password may include four or more digits and/or alphanumeric characters. In other embodiments the automated banking machine may prompt the user to provide biometric data as a password through use of a biometric reading device of the automated banking machine.

For automated banking machines that are operative to perform many different types of transaction functions, the automated banking machine may display a user interface screen similar to screen 100 of FIG. 3 after the customer inputs a PIN. As discussed previously, user interface screen 100 may include selectable functions 102 for withdrawing cash, depositing a check, transferring value between accounts, and viewing an electronic document. For automated banking machines such as the portable automated banking machine 520 of FIG. 16, the automated banking machine may immediately retrieve the electronic document stored in the "in-box" associated with the automated banking machine and display a user interface screen similar to screen 160 of FIG. 6. If more than one electronic document is present in the "in-box" the automated banking machine may display a listing of available electronic documents to choose from. In each case the exemplary automated banking machines may be operative to retrieve an electronic document in step 610 from the storage location and display a visual representation of the document in step 612.

The customer may read through the document being displayed and make any necessary inputs of information that the electronic document may require. For example, the electronic document may include clauses which require a customer to affirmatively agree thereto. Such clauses may include user interface elements such as a checkbox, entry fields, and/or drop down list boxes which can be checked/unchecked, edited, and/or selected with the input devices of the automated banking machine.

Once the document has been reviewed and updated with any necessary customer supplied information, in step 614 the customer may provide an input representative of a command to digitally sign the electronic document. In response, the automated banking machine may in step 616 prompt the customer to provide a further input that is representative of a confirmation by the customer that the digital signature is intended to be the customer's legally binding signature. For automated banking machines that include a digitizing signature pad, this confirming input may include having the customer draw his/her handwritten signature on the digitizing signature pad. The digital scan of the handwritten signature may then be integrated into the electronic document prior to digitally signing the document.

In response to receiving a confirming input, the automated banking machine in step 618 may cause the electronic document to be digitally signed using a private key associated with the financial account read from the customer's card. Once the document has been digitally signed it may be associated with one or more digital certificates including the digital certificate associated with the financial account. Such a digital certificate includes the customer's public key which can be used to verify the digital signature on the electronic document. In other embodiments, the electronic document may include a serial number and/or a reference to an entity, address or URL where the customer's digital certificate may be retrieved to verify the digital signature. In some embodiments, the digital certificate of the certificate authority which issued and signed the user's digital certificate may be associated with the electronic document.

Once the electronic document has been digitally signed, the automated banking machine in step 620 is operative to send the signed electronic document to one or more specified output addresses. Such a specified output address may include the original storage location where the automated banking machine retrieved the unsigned electronic document. Such a specified output address may include a portion of shared network drive which corresponds to an electronic "out box." Such a specified output address may correspond to a network address, e-mail address, data base, URL, or any other external storage location or communication system which is operative to receive an electronic document. For example, in one exemplary embodiment the specified output address may include a URL of a document processing server. For example, if the electronic document corresponds to a car loan, the specified output address may be a document processing server of a bank that is lending money to the customer to buy the car.

Such a document processing server may verify the digital signature of the electronic document. If the signature is valid, the document processing server may parse the XML tags of the electronic document to determine the name and address of the party and the terms of the loan. Such information may then be integrated into the loan processing system of the bank to establish a loan account and to initiate processes necessary to collect payments from the customer. In other exemplary embodiments, the specified output address may correspond to a loan processing system that is operative to securitize the loan for resale to another bank or other entity. In other exemplary embodiments, the specified output address may correspond to any system that is operative to store and/or process the signed electronic document.

In one exemplary embodiment the specified output address may be a configurable parameter within the automated banking machine. In other exemplary embodiments, the specified output address may be determined by the automated banking machine from a parameter of the electronic document. For example, the electronic document may include an XML tag which includes an address for the specified output address. In exemplary embodiments where the customer's financial account is associated with a digital safe deposit account, the automated banking machine may further cause a copy of the signed electronic document to be stored in the customer's digital safe deposit account which may be associated with the customer's financial account.

In the exemplary embodiment, the automated banking machine in step 622 may cause a digital signature processing fee to be assessed to a party associated with the electronic document. The exemplary automated banking machine is operative to cause a financial transaction processing system such as a host banking system or other server to record information associated with the processing fee in a database, log, or journal for immediate or delayed settlement. In an exemplary embodiment, the processing fee may be charged to the financial account associated with the customer's card. In other exemplary embodiments, the processing fee may be charged to an account associated with the organization that prepared the unsigned electronic document. For example, the automated banking machine may include a configuration parameter that corresponds to a financial account that may be assessed processing fees. In the case of a car dealership for example, the configuration parameter may include an account number associated with the car dealership or the bank providing the loan. In step 622 the automated banking machine or the digital signature service or network servers associated with the automated banking machine may communicate with a financial transaction processing system such as a host banking system to charge the processing fees to the account. In an exemplary embodiment, the electronic document may include an account number that is to be assessed the processing fees. For example the electronic document may include an XML tag for a fee processing account.

Also in some exemplary embodiments, the automated banking machine may contact a financial transaction processing system such as a host banking system or other server to authorize the assessing of the processing fee to an account prior to digitally signing the document in step 618 or prior to sending the signed electronic document to a specified output address in step 620. If the account does not have sufficient funds to pay for the processing fee or otherwise is not able to accept a charge of a processing fee, the automated banking machine may be operative to cancel the signing of the electronic document. The automated banking machine may then output a visual message through the display screen of the automated banking machine that indicates that the electronic document cannot be digitally signed.

The specified output address may correspond to a storage location that is accessible to the organization which created the unsigned document. For example, with reference to a car dealership, the specified output address may include the network drive which is accessible to the finance manager. The manager may then cause the electronic document to be printed out so that a hard copy view of the electronic document may be given to the customer. In other embodiments, the automated banking machine may be in operative connection with a printer and may include a selectable option for printing out a hard copy of the electronic document.

In some exemplary embodiments where the electronic document was previously signed by one or more further parties, the automated banking machine may include the step of validating the signature of the further party prior to enabling a user to digitally sign the electronic document. In the case of a car dealership for example, the finance manager may digitally sign the car loan prior to the automated banking machine accessing the electronic document. The digital signature of the car dealership may be verified by the automated banking machine prior to enabling the user to digitally sign the car loan. In such cases the electronic document may include the digital certificate associated with the further parties such as the car dealership. The electronic document may also include the digital certificates of the certificate authorities which signed the digital certificates of the further parties.

In the previously described embodiment, a financial account card of the customer was previously associated with the customer's digital safe deposit account, digital certificate, and/or private key. The exemplary embodiment may include a method for providing financial account cards with the ability to digitally sign electronic documents at an automated banking machine. For example, a credit card issuer such as a bank may have a plurality of credit card accounts. As the credit card business tends to be highly competitive, adding a digital signing capability to the credit cards of the bank's customers may provide an additional incentive for the customer to carry and use the bank's issued credit cards.

This described embodiment of the method may include the bank or other entity creating individual digital certificates, public/private key pairs, and/or digital safe deposit accounts for a plurality of pre-existing financial accounts such as credit card accounts or other financial accounts. Such individual digital certificates, public/private key pairs, and/or digital safe deposit accounts may be stored in association with each of the financial accounts on one or more servers operated by the bank or a digital signature service or network.

Figure 18:
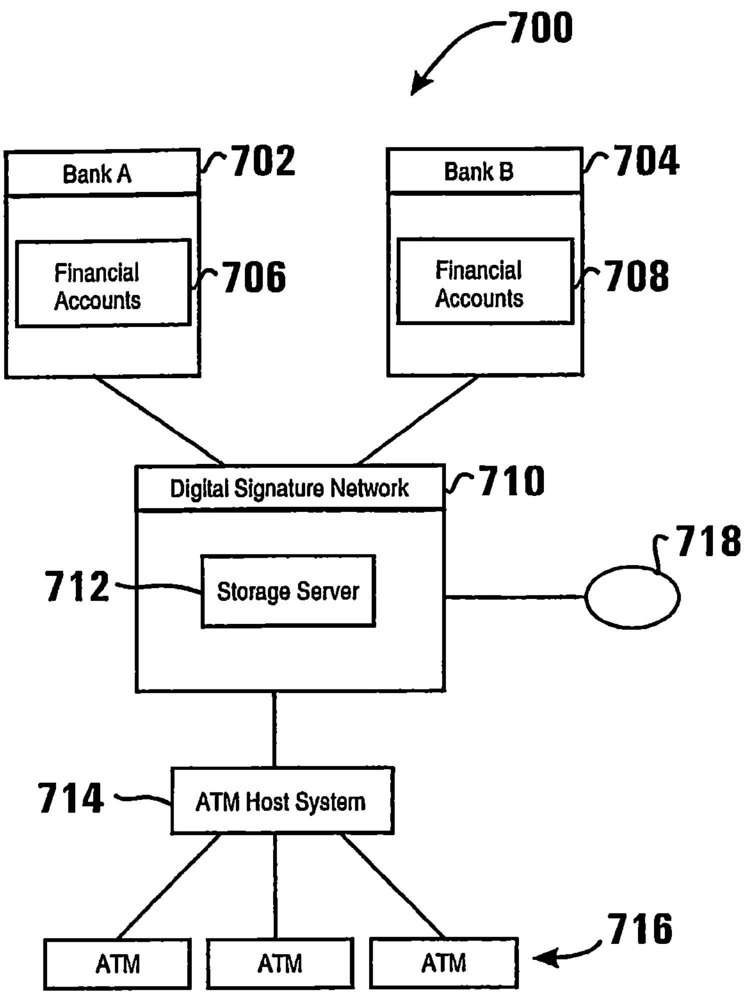
FIG. 18 shows a schematic view of a document signing system of a further exemplary embodiment.

FIG. 18 shows a schematic view of an exemplary embodiment of a system 700 that may be operative to carry out this described method. Here the system 700 includes a plurality of banks 702, 704, or other financial organizations. Each of the banks includes a plurality of financial accounts 706, 708 such as credit card accounts. For each of these accounts, the banks may have a digital signature service or network entity 710 manage a digital certificate, public/private key pair, and/or digital safe deposit account in one or more storage servers 712.

The exemplary embodiment of the digital signature service or network 710 includes or is in operative communication with a host system 714. The host system is operative to provide a plurality of automated banking machines 716 with access to the services of the digital signature network 710. Such services may include for example the digital signing of electronic documents and the storage of electronic documents in digital safe deposit accounts. As discussed previously, customers of the banks 702, 704 may use their credit cards or other cards associated with financial accounts to cause an automated banking machine to digitally sign electronic documents. The processing fees acquired from the signing of electronic documents may be transferred or assessed to at least one of the entities that operates the digital signature network and the banks or other card issuers. In one exemplary embodiment, the processing fees may be split between the entity that operates the digital signature network and the banks or other card issuers.

To advertise that the financial accounts of the customers may be used to digitally sign electronic documents, the described exemplary method may include marking or branding the cards issued by the bank with a logo, design, or mark which indicates that the card may be used to digitally sign electronic documents. Such a logo may be a source indicator mark such as a trademark/service mark for the digital signature network 710. In addition, to enable a customer to more easily locate the automated banking machines 716 which may be used to sign electronic documents, the automated banking machines 716 may include or output a matching logo. For banks or other entities with a large number of preexisting financial accounts such as credit cards, the exemplary embodiment of the presently described method may include mailing replacement credit cards to the customers which include a mark such as a logo which indicates that the card may be used to digitally sign electronic documents. In one exemplary embodiment, the customers may use the PIN previously associated with their financial account to access an automated banking machine for purposes of digitally signing an electronic document. In other exemplary embodiments, the bank may supply the user with a separate password for use with accessing the services of the digital signature network.

In some exemplary embodiments, the automated banking machine may be operative to cause a new digital certificate to be created for a user for use with signing an electronic document. For example, if the user does not have a previously issued digital certificate, public/private key pair and/or digital safe deposit account associated with a smart card, portable computing device, financial account, credit card, and/or digital safe deposit account, the exemplary automated banking machine may be operative to provide the user with a digital certificate, public/private key pair, and/or digital safe deposit account. In some exemplary embodiments, the automated banking machine may enable the user to forward the newly created digital certificate to a smart card, portable storage medium, portable computing device, networked storage location, or other user selectable storage location or address for use in signing electronic documents in the future through the exemplary automated banking machine or other digital signature software and devices. As will be discussed below, in some exemplary embodiments the automated banking machine may enable a user to associate the newly created digital certificate, public/private key pair, and/or digital safe deposit account with a card selected by the user or issued to the user by the digital signature network.

As with regard to the fees associated with the signing of electronic documents, fees may also be caused to be assessed by the automated banking machine for the creation of a digital certificate, a public/private key pair, and/or a digital safe deposit account. As discussed previously, such fees may be accessed to a financial account of the user, a financial account stored in association with the automated banking machine, or a financial account associated with the electronic document intended to be signed. For example, as in the previously discussed scenario of signing electronic documents related to car loans, the automated banking machine may be operative to cause the fees associated with the creation of the digital certificate to be associated with the entity supplying the electronic documents such as the car dealership or financial institution issuing the loan.

The described exemplary embodiment of the automated banking machine may prompt the user to enter through an input device of the automated banking machine information about the user which is to be integrated into and/or associated with the digital certificate. Such information may include the name, address, and birth date of the user. The information may also include the user's social security number, passport number, driver's license number, national identification number, student number, or any other unique number associated with the user. The information provided for generating the digital certificate may also include a user provided password or other number for use with creating or accessing public/private key pairs, the public key thereof being integrated into the digital certificate.

To expedite the input of information into the automated banking machine for generating the digital certificate, the automated banking machine may be operative to retrieve user specific information for the digital certificate from an electronic document intended to be digitally signed using the automated banking machine. For example, in the previous example scenario of a user signing loan documents for a car, the finance manager or other employee of the car dealership may input the user's name, address, social security number, birth date, drivers license number, and/or other user specific information into the electronic document that corresponds to the loan. Such information may be stored as XML data or another computer accessible format within or in association with the electronic document. Prior to the automated banking machine enabling the user to sign the electronic document, the automated banking machine may access the user specific information associated with the electronic document. The information accessed from the electronic document in addition to any information requested to be inputted directly into the automated banking machine by the user, may be caused to be integrated into a digital certificate by the automated banking machine. In some exemplary embodiments, the automated banking machine may output the user specific information through an output device of the automated banking machine. The automated banking machine may prompt the user to verify the accuracy of the information prior to causing digital certificate to be created.

In an exemplary embodiment, the automated banking machine may cause the user specific information to be forwarded to a certificate authority which is operative to issue a signed digital certificate for the user. In some embodiments, the automated banking machine may forward the user specific information to the previously discussed digital signature network, storage server, and/or other server which is operative to format the digital certificate and/or interface with the certificate authority to issue the digital certificate.

In an exemplary embodiment, the digital signature network may further be operative to authenticate the provided user specific information by contacting a credit reporting service 720 or other database of user information to compare and validate the provided user specific information. If the user specific information is invalid, inconsistent, or is otherwise suspect, the exemplary digital signature network may return a message to the automated banking machine which is representative of a denial to generate a digital certificate for the user. Such a message may indicate the reasons for the denial.

Exemplary embodiments of the automated banking machine may further acquire additional information from the user requesting the digital certificate including a biometric input, such as a fingerprint scan, a digital image of the user's face, iris scan, hand scan, or any other input which may be representative of the identity of the user. Such information may be integrated into or associated with the digital certificate. Such information may also be used to validate the identity of the user prior to creating the digital certificate.

In some exemplary embodiments, the automated banking machine may further prompt the user to input a card, such as a credit card, smart card, drivers license, national identification card, or any other unique card which can be accessed by the card reader of the automated banking machine to retrieve user specific information. Such user specific information may include an account number or other number stored on the card which can be forwarded to the digital signature network, financial transaction processing system such as a host banking system, or other server to be used to authenticate the identity of the user. In some exemplary embodiments, the automated banking machine may further prompt the user to input through an input device of the automated banking machine, a secret password or PIN associated with the card. The automated banking machine may be operative to validate the inputted secret password or PIN through communication with the digital signature network, host banking system, or the card itself.

In some exemplary embodiments, the automated banking machine may prompt the user to provide an input that indicates whether the user would like the newly created digital certificate, public/private key pairs and/or digital safe deposit account to be associated with a pre-existing financial account of the user such as a credit card or a bank card. In such cases, the exemplary automated banking machine may prompt the user to insert or swipe the desired card through the card reader of the automated banking machine. The account number read from the card may be forwarded to the digital signature network and be stored in association with the user's newly created digital certificate, public/private key pairs, and/or digital safe deposit account. The digital signature network may further notify the financial institution associated with the card, that the consumer has associated a digital certificate, public/private key pairs and/or digital safe deposit account with the account number of the card. The financial institution may then issue a new card to the user, which includes the mark or logo of the digital signature network.

Exemplary embodiments of the automated banking machine may also prompt the user, as to whether the user would like the newly created digital certificate, public/private key pairs and/or digital safe deposit account to be associated with other cards/numbers uniquely associated with the user. Such cards for example may include the user's social security card, drivers license card, national identification card, and student ID card. In such cases, the exemplary automated banking machine may prompt the user to insert or swipe the card with the desired unique number stored thereon through the card reader of the automated banking machine. The unique number read from the card may be forwarded to the digital signature network and be stored in association with the user's newly created digital certificate, public/private key pairs, and/or digital safe deposit account.

In some embodiments, where the newly created digital certificate, public/private key pairs, and/or digital safe deposit account is not associated with a financial account or other unique card/number of the user, the digital signature network may be operative to issue the user a digital signature card for use with signing future electronic documents and for accessing electronic documents stored in the user's digital safe deposit account. The digital signature card may include stored thereon a unique account number associated with the newly created digital certificate, public/private key pairs, and/or digital safe deposit account. In one exemplary embodiment, the automated banking machine may include a card issuing device which is operative to output the digital signature card directly to the user once the digital certificate is created. In further exemplary embodiments, the digital signature network may initiate the production of a digital signature card which is mailed to the address of the user.

Once the digital certificate, public/private key pair, and/or digital safe deposit account is created, the exemplary automated banking machine may proceed to prompt the user through the process of signing the electronic document using the private key associated with the newly created digital certificate.

In exemplary embodiments, where the user associates a financial account or other card/number with a newly created digital certificate or where a digital signature card is issued to the user, the automated banking machine may prompt the user to input through an input device of the automated banking machine, a secret password or PIN to be associated with the card for purposes of using the card in the future to sign electronic documents and/or for accessing electronic documents stored in the newly created digital safe deposit account. In the future, the user may use his/her credit card, digital signature card, or other card associated with the newly created digital certificate, public/private key pair, and/or digital safe deposit account to sign other electronic documents at the same automated banking machine or other exemplary automated banking machine connected to the exemplary digital signature network. As discussed previously exemplary embodiments of the automated banking machine may prompt the user to enter the password or PIN associated with the card prior to enabling the user to sign electronic documents and/or access electronic documents for a digital safe deposit account with the automated banking machine.

As shown in FIG. 18, the exemplary embodiment of the digital signature network may further be in communication with a public network such as the Internet 718 to enable user to access their digital certificate, public/private key pair, and/or digital safe deposit account from a home computer or other computing device. The digital signature network may further provide services over the Internet such as digitally signing electronic documents and/or storing electronic documents in a digital safe deposit account associated with a financial account. For example, in one exemplary embodiment, the digital signature network may include a web server which enables a user to enter his/her financial account number or other card/number and PIN or other password through a browser of a PC or other computing device. If the entered information is valid, the exemplary digital signature network may enable the user to sign an electronic document using the private key associated with the inputted financial account number or other card/numbers. The web server may further enable Internet users to manage electronic documents that are stored in the storage servers of the digital signature network 710, such as viewing, copying, deleting, and forwarding the documents to other locations and addresses.

Computer software used in operating the automated transaction machines of the described embodiments and connected computers, computer processors, and servers may be loaded from articles of various types into the respective computers. Such computer software may be included on and loaded from one or more articles such as diskettes, compact disks, or DVDs. Such software may also be included on articles such as hard disk drives, tapes, read-only memory devices, or memory cards. Other articles which include data representative of the instructions for operating computers in the manner described herein are suitable for use in achieving operation of automated transaction machines and associated digital signature services, networks and servers and systems in accordance with embodiments described herein.

The exemplary embodiments of the automated banking machines and systems described herein have been described with reference to particular software components, functions and features. Other embodiments may include other or different software components, digital signature algorithms, and cryptography components which provide similar functionality.

Thus the new automated transaction machine digital signature system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of embodiments, the manner in which it is constructed and operated, and the advantages and useful results attained; the new and useful structures, devices, elements, arrangements, parts, combinations, systems, equipment, operations, methods and relationships are set forth in the appended claims.

We claim:

1. An apparatus comprising:

at least one server that is operative to communicate with a plurality of automated banking machines, wherein each automated banking machine is operative responsive at least in part to data read from data bearing records to cause financial transfers, wherein at least one of the automated banking machines includes:

a card reader, wherein the card reader is operative to read card data from user cards, wherein the card data corresponds to financial accounts and includes a financial account number;

a cash dispenser;

at least one input device; and at least one display device, wherein the at least one automated banking machine is operative to cause the at least one display device to output a visual representation of at least one electronic document;

wherein the at least one server is operative to communicate with at least one data store, wherein the at least one automated banking machine is operative to communicate with at least one processor, wherein the at least one processor is operative responsive at least in part to at least one input from the at least one input device to cause the at least one electronic document for which the visual representation is outputted through the at least one display device to be digitally signed and stored in the at least one data store in correlated relation with the financial account number read by the card reader, which at least one data store is remote from the at least one automated banking machine, wherein the at least one server is operative to provide a user associated with the financial account number with access to information associated with the financial account number through a network connection to the at least one server, which information includes financial information associated with the financial account number and at least one visual image of the at least one electronic document stored in the at least one data store.

2. The apparatus according to claim 1, further comprising the at least one data store, the at least one automated banking machine, and the at least one processor.

3. The apparatus according to claim 2, wherein the at least one automated banking machine is operative to acquire the at least one electronic document from a user.

4. The apparatus according to claim 3, wherein the at least one automated banking machine includes a depository mechanism.

5. The apparatus according to claim 4, wherein the depository mechanism is operative to receive a deposit of a document.

6. The apparatus according to claim 5, wherein the depository mechanism is operative to receive a check.

7. The apparatus according to claim 1, wherein the at least one server is operative to provide instructions usable by a browser to generate at least one web page, which web page displays the at least one image of the at least one electronic document stored in the at least one data store.

8. The apparatus according to claim 7, wherein the at least one server is operative to enable the user associated with the financial account number to provide a password through operation of a remote computer, wherein the at least one server is operative to provide the instructions usable by the browser responsive at least in part to the password, wherein the remote computer includes the browser.

9. The apparatus according to claim 8, wherein the financial account number is a checking account number.

10. The apparatus according to claim 8, wherein the financial account number is a credit card account number.

11. The apparatus according to claim 8, wherein the financial account number is a debit card account number.

12. The apparatus according to claim 8, wherein the financial account number is a savings account number.

13. The apparatus according to claim 1, wherein the data bearing record includes at least one of a bank card, a credit card, a debit card, or any combination thereof.

14. The apparatus according to claim 1, wherein the at least one electronic document is representative of a contract.

15. The apparatus according to claim 1, wherein the at least one electronic document is representative of a loan.

16. The apparatus according to claim 1, wherein the at least one electronic document is representative of a mortgage.

17. An apparatus comprising:

at least one server that is operative to communicate with a plurality of automated banking machines, wherein each automated banking machine is operative responsive at least in part to data read from data bearing records to cause financial transfers, wherein at least one of the automated banking machines includes:

a card reader, wherein the card reader is operative to read card data from user cards, wherein the card data corresponds to a financial account and includes a financial account number;

a cash dispenser;

at least one input device;

at least one display device, wherein the at least one automated banking machine is operative to cause the at least one display device to output a visual representation of at least one electronic document;

at least one data store in operative communication with the at least one server, wherein the at least one data store is remote from the at least one automated banking machine;

wherein the at least one automated banking machine is operative to communicate with at least one processor, wherein the at least one processor is operative responsive at least in part to at least one input from the at least one input device to cause the at least one electronic document for which the visual representation is outputted through the at least one display device to be stored in the at least one data store in correlated relation with the financial account number read by the card reader;

wherein the at least one server is operative to provide a user associated with the financial account number with access to information associated with the financial account number through a network connection to the at least one server, which information includes financial information associated with the financial account number and at least one visual image of the at least one electronic document stored in the at least one data store.

18. The apparatus according to claim 17, further comprising the at least one processor.

19. The apparatus according to claim 17, further comprising the at least one automated banking machine.

20. The apparatus according to claim 17, wherein the at least one server is operative to provide instructions usable by a browser to generate at least one web page, which web page displays the at least one image of the at least one electronic document stored in the at least one data store.

21. An apparatus comprising:

at least one server that is operative to communicate with a plurality of automated banking machines, wherein each automated banking machine is operative responsive at least in part to data read from data bearing records to cause financial transfers, wherein at least one of the automated banking machines includes:

a reader, wherein the reader is configured to read data associated with a user of the at least one automated banking machine, which read data is usable by the at least one automated banking machine to determine a financial account number associated with the user of the at least one automated banking machine;

a cash dispenser;

at least one input device;

at least one display device, wherein the at least one automated banking machine is operative to cause the at least one display device to output a visual representation of at least one electronic document;

at least one data store in operative communication with the at least one server, wherein the at least one data store is remote from the at least one automated banking machine;

wherein the at least one automated banking machine is operative to communicate with at least one processor, wherein the at least one processor is operative responsive at least in part to at least one input from the at least one input device to cause the at least one electronic document for which the visual representation is outputted through the at least one display device to be stored in the at least one data store in correlated relation with the financial account number associated with the user of the at least one automated banking machine;

wherein the at least one server is operative to provide the user associated with the financial account number with access to information associated with the financial account number through a network connection to the at least one server, which information includes financial information associated with the financial account number and at least one visual image of the at least one electronic document stored in the at least one data store.

* * * * *